United States Patent
Nale

(10) Patent No.: US 10,152,370 B2
(45) Date of Patent: Dec. 11, 2018

(54) METHOD AND APPARATUS FOR DETERMINING A TIMING ADJUSTMENT OF OUTPUT TO A HOST MEMORY CONTROLLER

(71) Applicant: INTEL CORPORATION, Santa Clara, CA (US)

(72) Inventor: Bill Nale, Livermore, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/967,210

(22) Filed: Dec. 11, 2015

(65) Prior Publication Data

US 2016/0098195 A1 Apr. 7, 2016

Related U.S. Application Data

(63) Continuation of application No. 13/977,653, filed as application No. PCT/US2013/032633 on Mar. 15, 2013.

(51) Int. Cl.
*G06F 12/00* (2006.01)
*G06F 11/07* (2006.01)
(Continued)

(52) U.S. Cl.
CPC .......... *G06F 11/0793* (2013.01); *G06F 3/061* (2013.01); *G06F 3/0604* (2013.01);
(Continued)

(58) Field of Classification Search
CPC .. G11C 7/22; G11C 7/222; G11C 5/04; G06F 13/1689; G06F 13/4234; G06F 3/061;
(Continued)

(56) References Cited

U.S. PATENT DOCUMENTS 4,148,099 A 4/1979 Lauffer et al.
5,555,250 A 9/1996 Walker et al.
(Continued)

FOREIGN PATENT DOCUMENTS

CN 1433025 7/2003
CN 102096611 6/2011
(Continued)

OTHER PUBLICATIONS

Elpida Memory, Inc., "How to Use DDR SDRAM", Users Manual, Doc. No. E0234E30, Ver. 3.0, Apr. 2002, 90 pp.
(Continued)

*Primary Examiner* — Arvind Talukdar
(74) *Attorney, Agent, or Firm* — Konrad Raynes Davda & Victor LLP; David W. Victor

(57) ABSTRACT

Provided are a method and apparatus for determining a timing adjustment of output to a host memory controller in a first memory module coupled to a host memory controller and a second memory module over a bus. A determination is made of a timing adjustment based on at least one component in at least one of the first memory module and the second memory module. A timing of output to the host memory controller is adjusted based on the determined timing adjustment to match a timing of output at the second memory module.

22 Claims, 17 Drawing Sheets

(51) Int. Cl.

| | | |
|---|---|---|
| G11C 29/02 | (2006.01) | |
| G06F 12/0813 | (2016.01) | |
| G06F 13/16 | (2006.01) | |
| G06F 3/06 | (2006.01) | |
| G06F 12/0802 | (2016.01) | |
| G06F 12/02 | (2006.01) | |
| G06F 13/42 | (2006.01) | |
| G11C 7/22 | (2006.01) | |
| G11C 11/406 | (2006.01) | |
| G11C 5/14 | (2006.01) | |
| H04L 9/08 | (2006.01) | |
| G11C 5/04 | (2006.01) | |
| G11C 7/10 | (2006.01) | |

(52) U.S. Cl.
CPC .......... *G06F 3/0629* (2013.01); *G06F 3/0638* (2013.01); *G06F 3/0673* (2013.01); *G06F 3/0683* (2013.01); *G06F 11/079* (2013.01); *G06F 11/0727* (2013.01); *G06F 11/0751* (2013.01); *G06F 11/0772* (2013.01); *G06F 12/023* (2013.01); *G06F 12/0802* (2013.01); *G06F 12/0813* (2013.01); *G06F 13/1663* (2013.01); *G06F 13/1678* (2013.01); *G06F 13/1689* (2013.01); *G06F 13/1694* (2013.01); *G06F 13/4234* (2013.01); *G06F 13/4243* (2013.01); *G06F 13/4282* (2013.01); *G11C 5/148* (2013.01); *G11C 7/1003* (2013.01); *G11C 7/1072* (2013.01); *G11C 7/222* (2013.01); *G11C 11/40618* (2013.01); *G11C 29/023* (2013.01); *G11C 29/028* (2013.01); *H04L 9/0869* (2013.01); *G06F 2212/1044* (2013.01); *G06F 2212/2532* (2013.01); *G06F 2212/60* (2013.01); *G11C 5/04* (2013.01); *G11C 7/1063* (2013.01)

(58) Field of Classification Search
CPC ...... G06F 12/023; G06F 7/1003; G06F 3/604; G06F 12/1678
See application file for complete search history.

(56) References Cited

U.S. PATENT DOCUMENTS

| | | |
|---|---|---|
| 5,613,078 A | 3/1997 | Kishigami |
| 5,784,390 A | 7/1998 | Masiewicz et al. |
| 5,805,905 A | 9/1998 | Biswas et al. |
| 6,088,762 A | 7/2000 | Greta |
| 6,260,101 B1 | 7/2001 | Hansen et al. |
| 6,457,081 B1 | 9/2002 | Gulick |
| 6,625,685 B1 | 9/2003 | Cho et al. |
| 6,658,523 B2 | 12/2003 | Janzen et al. |
| 6,683,884 B1 | 1/2004 | Howard |
| 6,795,354 B2 | 9/2004 | Cho et al. |
| 7,177,989 B1 | 2/2007 | McGinnis |
| 7,254,688 B2 | 8/2007 | Uneme |
| 7,966,439 B1 | 6/2011 | Treichler et al. |
| 8,272,781 B2 | 9/2012 | Nale |
| 8,386,737 B2 | 2/2013 | Jeon et al. |
| 8,410,819 B2 | 4/2013 | Himpe |
| 8,665,665 B2 | 3/2014 | Huang |
| 8,862,973 B2 | 10/2014 | Bains et al. |
| 8,930,647 B1* | 1/2015 | Smith ................. G06F 9/44557 711/103 |
| 2002/0002662 A1 | 1/2002 | Olarig et al. |
| 2002/0194418 A1 | 12/2002 | Nishtala et al. |
| 2003/0189868 A1 | 10/2003 | Riesenman et al. |
| 2004/0177262 A1 | 9/2004 | Lee |
| 2004/0250053 A1 | 12/2004 | McGrath et al. |
| 2005/0002259 A1 | 1/2005 | Suyama |
| 2005/0010710 A1 | 1/2005 | Yim et al. |
| 2005/0163318 A1 | 7/2005 | Duffield et al. |
| 2006/0015660 A1 | 1/2006 | Nguyen et al. |
| 2006/0149857 A1* | 7/2006 | Holman .............. G06F 13/1689 710/3 |
| 2006/0262608 A1 | 11/2006 | Babb et al. |
| 2007/0033336 A1 | 2/2007 | Oh |
| 2007/0061536 A1* | 3/2007 | Ivanov ................ G11C 7/1006 711/167 |
| 2007/0250756 A1 | 10/2007 | Gower et al. |
| 2008/0059829 A1 | 3/2008 | Boskovic |
| 2008/0126664 A1* | 5/2008 | Chan .................... G11C 29/028 710/316 |
| 2008/0155141 A1 | 6/2008 | LaBerge |
| 2008/0201496 A1 | 8/2008 | Gillingham |
| 2008/0205446 A1 | 8/2008 | Popescu et al. |
| 2008/0235444 A1 | 9/2008 | Gower et al. |
| 2009/0006691 A1 | 1/2009 | Eggleston |
| 2009/0041057 A1 | 2/2009 | Dickens et al. |
| 2009/0070612 A1 | 3/2009 | Adelman et al. |
| 2009/0113158 A1* | 4/2009 | Schnell .............. G06F 13/1689 711/167 |
| 2009/0119432 A1 | 5/2009 | Lee et al. |
| 2009/0207850 A1 | 8/2009 | Osano et al. |
| 2009/0225623 A1 | 9/2009 | Walker |
| 2009/0276597 A1 | 11/2009 | Reed |
| 2009/0327800 A1 | 12/2009 | Kim |
| 2010/0049936 A1 | 2/2010 | Lin |
| 2010/0162020 A1 | 6/2010 | Maule et al. |
| 2010/0318840 A1 | 12/2010 | Tsai |
| 2011/0072201 A1 | 3/2011 | Lee et al. |
| 2011/0090754 A1 | 4/2011 | Kim et al. |
| 2011/0138261 A1 | 6/2011 | Bains et al. |
| 2011/0161568 A1 | 6/2011 | Bruce et al. |
| 2011/0185256 A1 | 7/2011 | Nygren et al. |
| 2011/0219285 A1 | 9/2011 | Nakamura |
| 2011/0246791 A1 | 10/2011 | Kambayashi et al. |
| 2011/0296214 A1 | 12/2011 | Amtzen et al. |
| 2011/0320869 A1 | 12/2011 | Gower et al. |
| 2012/0030396 A1 | 2/2012 | Zhu et al. |
| 2012/0089789 A1 | 4/2012 | Shirlen et al. |
| 2012/0137139 A1 | 5/2012 | Kudoh et al. |
| 2012/0163605 A1 | 6/2012 | Sharon et al. |
| 2012/0169375 A1 | 7/2012 | Himpe |
| 2012/0239900 A1 | 9/2012 | Nautiyal et al. |
| 2012/0250426 A1 | 10/2012 | Huang |
| 2013/0007399 A1* | 1/2013 | Smith ................. G06F 1/08 711/167 |
| 2013/0031412 A1 | 1/2013 | Iwasaki |
| 2013/0257498 A1 | 10/2013 | Ge et al. |
| 2013/0290578 A1 | 10/2013 | Chrysos et al. |
| 2014/0040639 A1 | 2/2014 | Raam |
| 2014/0119130 A1 | 5/2014 | Trivedi et al. |
| 2014/0122777 A1 | 5/2014 | Oh et al. |
| 2015/0149735 A1 | 5/2015 | Nale et al. |

FOREIGN PATENT DOCUMENTS

| | | |
|---|---|---|
| CN | 102737718 | 10/2012 |
| JP | 2004524641 | 8/2004 |
| JP | 2011040041 | 2/2011 |
| RU | 2369033 | 9/2009 |
| WO | WO2012036905 A1 | 3/2012 |

OTHER PUBLICATIONS

Intel Corporation, "Intel Extreme Memory Profile (Intel XMP) DDR3 Technology", White Paper, Jan. 2009, 12 pp.

JEDEC Solid State Technology Association, "DDR3 SDRAM Standard", JEDEC Standard No. 79-3F, Jul. 2012, 226 pp.

JEDEC Solid State Technology Association, "DDR4 SDRAM", JEDEC Standard No. 79-4, Sep. 2012, 214 pp.

JEDEC Solid State Technology Association, "Low Power Double Data Rate (LPDDR) SDRAM Standard", JESD209B, JEDEC Standard, Feb. 2010, 76 pp.

Kinsley, T., "DDR4 Module Level Trends and Features", JEDEC Global Standards for the Microelectronics Industry, Server Memory Forum 2011, 31 pp.

(56) References Cited

OTHER PUBLICATIONS

Lee, S., "Introduction to LPDDR3", LPDDR3 Symposium 2012, 22 pp.
Samsung Electronics, "DDR3 SDRAM Specification", Device Operation & Timing Diagram, Rev. 1.21, Sep. 2010, 69 pp.
Super Talent Electronics, Inc., "DDR SDRAM DIMM", Product Specification, Revision DFC 10/04 version: b, 2004, 9 pp.
Wikipedia, "Advanced Configuration and Power Interface", [online], Last Modified Feb. 22, 2013, [Retrieved on Mar. 6, 2013], retrieved from the Internet at <URL: http://en.wikipedia.org/wiki/Advanced_Configuration_and_Power_Interface>, 6 pp.
Wikipedia, "Scrambler", [online], Last Modified Feb. 26, 2013, [Retrieved on Mar. 11, 2013], retrieved from the Internet at <URL: http://en.wikipedia.org/wiki/Scrambler>, 4 pp.
International Search Report and Written Opinion for International Application No. PCT/US2013/032633, dated Dec. 30, 2103, 19 pp.
International Preliminary Report on Patentability for International Application No. PCT/US2013/032633, Sep. 24, 2015, 13 pp.
U.S. Appl. No. 14/967,226, "Method and Apparatus for Encoding Registers in a Memory Module", by B. Nale et al., filed Dec. 11, 2015, 52 pp.
U.S. Appl. No. 14/967,230, "Method and Apparatus for a Memory Module to Accept a Command in Multiple Parts", by B. Nale et al., filed Dec. 11, 2015, 53 pp.
U.S. Appl. No. 14/995,145, "Method and Apparatus for Setting High Address Bits in a Memory Module", by B. Nale, filed Jan. 13, 2016, 53 pp.
U.S. Appl. No. 15/011,383, "Method and Apparatus for Using a Pre-Clock Enable Command for Power Management Modes", by B. Nale, filed Jan. 29, 2016, 53 pp.
U.S. Appl. No. 15/058,126, "Method and Apparatus for Providing a Host Memory Controller Write Credits for Write Commands", by B. Nale et al., filed Mar. 1, 2016, 53 pp.
U.S. Appl. No. 15/080,577, "Method and Apparatus for Performing Error Handling Operations Using Error Signals", by B. Nale et al., filed Mar. 24, 2016, 52 pp.
U.S. Appl. No. 15/058,129, "Method and Apparatus for Using an Error Signal to Indicate a Write Request Error and Write Request Acceptance", by B. Nale et al., filed Mar. 1, 2016, 52 pp.
U.S. Appl. No. 15/080,580, "Method and Apparatus for Scrambling Read Data in a Memory Module", by B. Nale et al., filed Mar. 24, 2016, 52 pp.
U.S. Appl. No. 15/011,375, "Method and Apparatus for Selecting One of a Plurality of Bus Interface Configurations to Use", by B. Nale, filed Jan. 29, 2016, 54 pp.
Response to Final Office Action 1 for U.S. Appl. No. 13/977,653, dated Oct. 31, 2016, 12 pp.
Response to Office Action 1 for U.S. Appl. No. 14/967,226, dated Nov. 8, 2016, 10 pp.
Office Action 1 for U.S. Appl. No. 15/058,126, dated Oct. 31, 2016, 31 pp.
Office Action 1 for U.S. Appl. No. 15/058,129, dated Oct. 31, 2016, 26 pp.
European Search Report for EP Application No. 13877923.6, dated Sep. 30, 2016, 14 pp.
Office Action 1 for U.S. Appl. No. 13/977,653, dated Nov. 13, 2015, 31 pp.
Response to Office Action 1 for U.S. Appl. No. 13/977,653, dated Feb. 16, 2016, 12 pp.
Supplemental Response to Office Action 1 for U.S. Appl. No. 13/977,653, dated Mar. 3, 2016, 9 pp.
Final Office Action 1 for U.S. Appl. No. 13/977,653, dated Jul. 29, 2016, 32 pp.
Office Action 1 for U.S. Appl. No. 14/967,226, dated Jul. 8, 2016, 24 pp.
Office Action 1 for U.S. Appl. No. 14/967,230, dated Aug. 26, 2016, 32 pp.
Office Action 1 for U.S. Appl. No. 14/995,145, dated Oct. 3, 2016, 27 pp.
Office Action 1 for U.S. Appl. No. 15/011,383, dated Sep. 8, 2016, 24 pp.
Office Action 1 for U.S. Appl. No. 15/011,375, dated Sep. 7, 2016, 24 pp.
Notice of Allowance for KR Application No. 10-2015-7022074, dated Jul. 25, 2016, 4 pp. (W/ English Machine Translation).
Office Action 1 for RU Application No. 2015134146, dated Sep. 28, 2016, 10 pp. (W/ English Translation).
Response to Final Office Action 1 for U.S. Appl. No. 14/967,226, dated Apr. 6, 2017, 14 pp.
Response to Final Office Action 1 for U.S. Appl. No. 14/967,230, dated Apr. 10, 2017, 16 pp.
Response to Final Office Action 1 for U.S. Appl. No. 14/995,145, dated Apr. 10, 2017, 15 pp.
Response to Final Office Action 1 for U.S. Appl. No. 15/011,383, dated Apr. 12, 2017, 13 pp.
Final Office Action 1 for U.S. Appl. No. 15/058,126, dated Apr. 7, 2017, 46 pp.
Response to Office Action 1 for U.S. Appl. No. 15/080,577, dated Apr. 17, 2017, 13 pp.
Response to Final Office Action 1 for U.S. Appl. No. 15/011,375, dated Apr. 16, 2017, 14 pp.
U.S. Pat. No. 6,795,354, dated Sep. 21, 2004, is an English Language Equivalent of CN Publication No. 1433025, dated Jul. 30, 2003.
U.S. Pat. No. 8,862,973, dated Oct. 14, 2014, is an English Language Equivalent of CN Publication No. 102096611, dated Jun. 15, 2011.
U.S. Pat. No. 8,665,665, dated Mar. 4, 2014, is an English Language Equivalent of CN Publication No. 102737718, dated Oct. 17, 2012.
Micron Technology, Inc., "DDR SDRAM Small-Outline DIMM", © 2004, 41 pp.
Office Action 3 for U.S. Appl. No. 13/977,653, dated Jan. 20, 2017, 35 pp.
Supplemental Response to Office Action 1 for U.S. Appl. No. 14/967,226, dated Jan. 3, 2017, 7 pp.
Final Office Action 1 for U.S. Appl. No. 14/967,226, dated Jan. 6, 2017, 33 pp.
Response to Office Action 1 for U.S. Appl. No. 14/967,230, dated Nov. 28, 2016, 13 pp.
Final Office Action 1 for U.S. Appl. No. 14/967,230, dated Feb. 10, 2017, 41 pp.
Response to Office Action 1 for U.S. Appl. No. 14/995,145, dated Jan. 3, 2017, 13 pp.
Final Office Action 1 for U.S. Appl. No. 14/995,145, dated Feb. 9, 2017, 38 pp.
Response to Office Action 1 for U.S. Appl. No. 15/011,383, dated Dec. 8, 2016, 12 pp.
Final Office Action 1 for U.S. Appl. No. 15/011,383, dated Feb. 9, 2017, 34 pp.
Response to Office Action 1 for U.S. Appl. No. 15/058,126, dated Jan. 31, 2017, 15 pp.
Office Action 1 for U.S. Appl. No. 15/080,577, dated Jan. 17, 2017, 34 pp.
Response to Office Action 1 for U.S. Appl. No. 15/058,129, dated Jan. 31, 2017, 14 pp.
Office Action 1 for U.S. Appl. No. 15/080,580, dated Nov. 21, 2016, 25 pp.
Response to Office Action 1 for U.S. Appl. No. 15/080,580, dated Feb. 21, 2016, pp.
Response to Office Action 1 for U.S. Appl. No. 15/011,375, dated Dec. 7, 2016, 13 pp.
Final Office Action 1 for U.S. Appl. No. 15/011,375, dated Feb. 9, 2017, 32 pp.
Office Action 1 for CN Application No. 201380073070.3, dated Feb. 3, 2017, 13 pp.
Response to Office Action 1 for RU Application No. 2015134146, dated Dec. 28, 2016, 26 pp.
Final Office Action 2 for U.S. Appl. No. 13/977,653, dated Jul. 14, 2017, 37 pp.
Office Action 3 for U.S. Appl. No. 15/011,383, dated Jul. 28, 2017, 38 pp.

(56) References Cited

OTHER PUBLICATIONS

Response to Final Office Action 1 for U.S. Appl. No. 15/058,126, dated Jun. 7, 2017, 16 pp.
Second Response to Final Office Action 1 for U.S. Appl. No. 15/058,126, dated Jun. 26, 2017, 17 pp.
Final Office Action 1 for U.S. Appl. No. 15/080,577, dated Jul. 27, 2017, 37 pp.
Response to Final Office Action 1 for U.S. Appl. No. 15/058,129, dated Jun. 27, 2017, 12 pp.
Second Response to Final Office Action 1 for U.S. Appl. No. 15/058,129, dated Jul. 20, 2017, 12 pp.
Final Office Action 1 for U.S. Appl. No. 15/080,580, dated May 17, 2017, 24 pp.
Response to Final Office Action 1 for U.S. Appl. No. 15/080,580, dated Jul. 11, 2017, 14 pp.
Response to Office Action 1 for CN Application No. 2013800730703, dated Jun. 16, 2017, 9 pp.
Notice of Allowance 1 for RU Application No. 2015134146, dated Mar. 22, 2017, 15 pp. (W/ English Language Claims at Allowance).
Office Action 2 for CN Application No. 2013800730703, dated Sep. 13, 2017, 35 pp.
Response to Final Office Action 2 for U.S. Appl. No. 13/977,653, dated Oct. 7, 2017, 9 pp.
Notice of Allowance 2 for U.S. Appl. No. 14/967,226, dated Sep. 6, 2017, 14 pp.
Office Action 3 for U.S. Appl. No. 14/967,230, dated Oct. 6, 2017, 30 pp.
Office Action 3 for U.S. Appl. No. 14/995,145, dated Sep. 7, 2017, 25 pp.
Office Action 3 for U.S. Appl. No. 15/058,126, dated Oct. 18, 2017, 47 pp.
Second Response to Final Office Action 1 for U.S. Appl. No. 15/080,580, dated Sep. 6, 2017, 15 pp.
Office Action 3 for U.S. Appl. No. 15/011,375, dated Sep. 22, 2017, 32 pp.
Response to Office Action 3 for U.S. Appl. No. 13/977,653, dated Apr. 20, 2017, 13 pp.
Notice of Allowance for U.S. Appl. No. 14/967,226, dated May 8, 2017, 38 pp.
Second Response to Final Office Action 1 for U.S. Appl. No. 15/011,383, dated May 9, 2017, 13 pp.
Final Office Action 1 for U.S. Appl. 15/058,129, dated May 5, 2017, 42 pp.
Second Response to Final Office Action 1 for U.S. Appl. No. 15/011,375, dated May 9, 2017, 15 pp.
U.S. Pat. No. 6,658,523, dated Dec. 2, 2003, is an English Language Equivalent of JP Publication No. 2004524641, dated Aug. 12, 2004.
U.S. Pat. No. 8,386,737, dated Feb. 26, 2013, is an English Language Equivalent of JP Publication No. 2011040041, dated Feb. 24, 2011.
Office Action 3 for CN Application No. 201380073070.3, dated Feb. 9, 2018, 8 pp. (w/ English Language Translation).
Response to Office Action 3 for CN Application No. 201380073070.3, dated Apr. 24, 2018, 15 pp. (w/ English Language Translation of Claims).
Office Action 1 for JP Application No. 2017-087729, dated Jan. 31, 2018, 5 pp. [w/ English Language Machine Translation].
Notice of Allowance 1 for U.S. Appl. No. 13/977,653, dated Jan. 24, 2018, 19 pp.
Final Office Action 2 for U.S. Appl. No. 15/011,383, dated Mar. 19, 2018, 47 pp.
Response to Office Action 3 for U.S. Appl. No. 15/058,126, dated Jan. 18, 2018, 17 pp.
Office Action 3 for U.S. Appl. No. 15/080,577, dated Feb. 12, 2018, 36 pp.
Office Action 3 for U.S. Appl. No. 15/058,129, dated Mar. 1, 2016, 39 pp.
Response to Office Action 3 for U.S. Appl. No. 15/080,580, dated Apr. 10, 2018, 14 pp.

* cited by examiner

US 10,152,370 B2

METHOD AND APPARATUS FOR DETERMINING A TIMING ADJUSTMENT OF OUTPUT TO A HOST MEMORY CONTROLLER

CROSS-REFERENCE TO RELATED APPLICATION

This application is a continuation of U.S. patent application Ser. No. 13/977,653, filed Jun. 28, 2013, which is the National Stage of International Application No. PCT/US2013/032633, filed Mar. 15, 2013, wherein all the above related applications are all incorporated herein by reference in their entirety.

TECHNICAL FIELD

Embodiments described herein generally relate to a memory system in which a host memory controller communicates on a single channel or bus with multiple memory modules that have a pin layout compatible with the slots coupled to the channel and host memory controller. The host memory controller supports a protocol used by the multiple memory modules coupled to the channel, such as the Double Data Rate Third Generation (DDR3) protocol. If memory modules, such as Dual In-Line Memory Modules (DIMMs), have different timings for outputting data on the bus, such as the case with different types of DIMMs, then the host memory controller has to adjust for those timing differences among the different coupled DIMMs. The host memory controller may communicate single cycle commands.

Before using the bus, the host memory controller must configure the memory modules for operations. In the DDR3 protocol, the host memory controller may use a Mode Register Set (MRS) command to program up to eight mode registers in the memory chips, such as Dynamic Random Access Memory (DRAM) chips, on the memory module package. The MRS command identifies the mode register on the memory chip and includes an inversion bit indicating whether data is inverted. After the bus is trained, the host memory controller may then use the bus for read and write commands and to transfer data.

Commands may be sent one bit per lane per command. During a normal timing mode, e.g., 1N timing, the chip select signal is placed on the bus on the cycle of the command to cause the selected memory module to accept the command. During high speed operations, such as during 2N timing, the host memory controller places the chip select signal on the bus one clock cycle before the command to allow for additional setup time.

A clock enable signal may be used to manage internal clock signals in the memory module. A clock enable (CKE) high signal activates internal clock signals and is maintained high throughout read and write accesses. A CKE low signal to the memory module deactivates internal clock signals, device input buffers and output drivers. Taking CKE Low signals power down and refresh operations.

When writes are communicated from the host memory controller to a memory module, the writes at the memory module may be directly written to the memory chips. However, in memory modules having a write buffer, a credit system may be implemented where the host memory controller is allotted a maximum number of write credits and cannot send a write command unless there are available write credits. The write credits are decremented upon sending a write command. The memory module will send a message over the bus when each write has completed to return the credit to the host memory controller, which increments the write credit counter when the message is received.

To avoid communicating a vexatious pattern when sending read and write requests, current host memory controllers may scramble the data to reduce the probability of repeatedly producing a vexatious pattern that can cause an error on the bus. Upon receiving scrambled write data with a write address, the memory module stores the scrambled write data at the write address. In response to a read request, the scrambled data that is stored and sent over the bus to the host memory controller to descramble and use.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Certain embodiments relate to memory devices electronic assemblies. Embodiments include both devices and methods for forming electronic assemblies.

Figure 1:
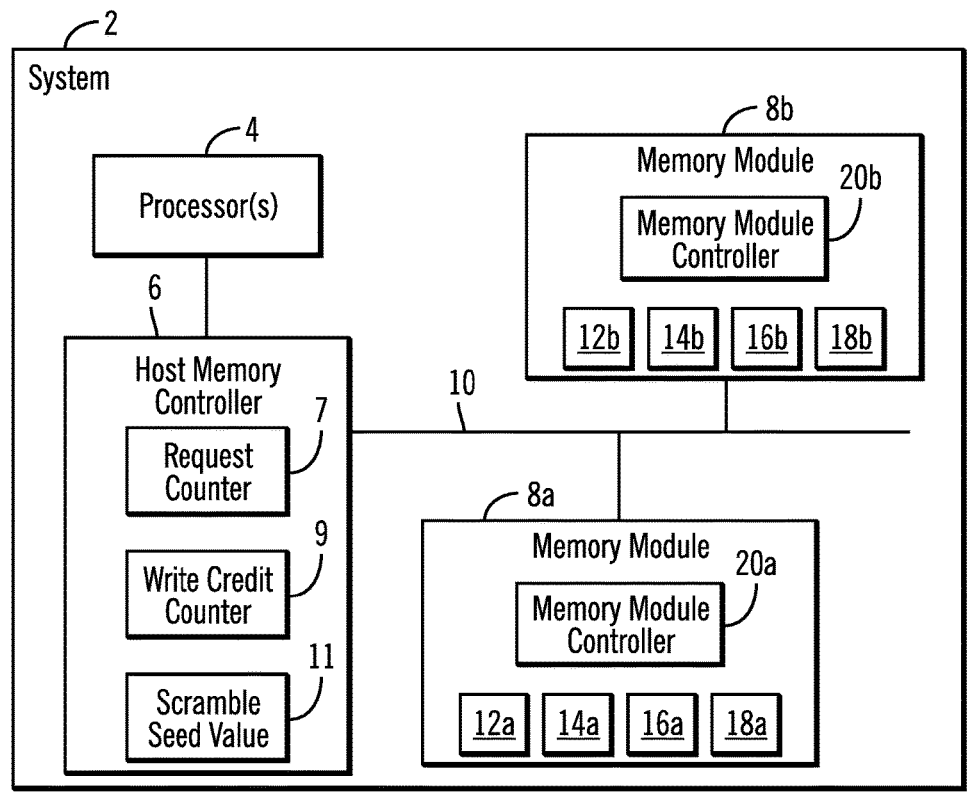
FIG. 1 illustrates an embodiment of a system having a memory system.

FIG. 1 illustrates an embodiment of a computing system 2 including one or more processors 4, a host memory controller 6 and multiple memory modules 8a, 8b, which are typically mounted on a motherboard. The processors 4 may comprise a central processing unit, multi-core processor. The host memory controller 6, in response to memory access requests from the processors 4, communicates with multiple memory modules 8a, 8b over a bus 10, also referred to as a channel, bus interface, etc., where both memory modules 8a, 8b are separately and independently connected to the same bus 10. The host memory controller 6 may include a request counter 7 that is incremented when receiving a request signal for a grant to use when later issuing grants based on the number of requests indicated in the request counter 7, a write credit counter 9 indicating a number or credits permitting write requests to be sent to one of the memory modules 8a, 8b, and a scramble seed value 11 used to descramble read requested data from one of the memory modules 8a, 8b.

In the embodiment of FIG. 1, the memory modules 8a, 8b are mounted in slots or memory sockets on the system 2 motherboard. The memory modules 8a, 8b may comprise the same or different types of memory modules that have a pin arrangement compatible with the pin arrangement in the memory slots on the motherboard. Further, the memory modules may support the same or different memory protocols, such as Double Data Rate Fourth Generation (DDR4) protocol and additional protocols. Although only two memory modules 8a, 8b are shown, there may be multiple memory modules Each of the memory modules 8a, 8b include memory chips 12a, 14a, 16a, 18a and 12b, 14b, 16b, 18b, respectively, on one or both sides of the memory module, to store the data. The memory chips, e.g., DRAM chips, located on one or both sides of the memory module 8a, 8b package, comprise the storage elements that store data being used by the processor 4.

Each memory module 8a, 8b may include a memory module controller 20a, 20b to coordinate memory management and access operations with the host memory controller 6. The host memory controller 6 includes logic to manage read and write operations and memory management operations with respect to the memory modules 8a, 8b connected to the bus 10, and interface the processor 4 to the memory modules 8a, 8b. The host memory controller 6 may be integrated with the processor 4 or implemented in logic separate from the processor 4 on the system 2 motherboard.

The system 2 motherboard may include a memory socket compatible with different types of memory chips, to allow different types of memory modules 8a, 8b supporting different types of memory devices supporting different memory protocols as long as the different types of memory modules 8a, 8b are compatible with the pin architecture in the memory sockets.

In one embodiment, the memory modules 8a, 8b may comprise a same or different type of Dynamic Random Access Memories (DRAMs). In one embodiment, the memory modules 8a, 8b may comprise Dual In-Line Memory Modules (DIMMs), such as unbuffered DIMMs (UDIMM), Load Reduced Dual-inline Memory Module (LRDIMM), a Small Outline Dual In-line Memory Module (SODIMM), etc. The memory modules 8a, 8b may implement various forms of memory, including, but not limited to, NAND (flash) memory, ferroelectric random-access memory (FeTRAM), nanowire-based non-volatile memory, three-dimensional (3D) crosspoint memory such as phase change memory (PCM), memory that incorporates memristor technology, Magnetoresistive random-access memory (MRAM), Spin Transfer Torque (STT)-MRAM, etc.

In certain embodiments, because different types of memory modules 8a, 8b may be mounted and connected to the bus 10, the memory modules 8a, 8b may support different protocols. For instance, the memory module 8a may comprise a type of DIMM conforming to the Double Data Rate Fourth Generation (DDR4) Static DRAM (SDRAM) protocol and the memory module 8b may use a different protocol but be compatible on the same bus 10 with the memory module 8a using the DDR4 protocol. Alternative and different protocols may also be used and implemented in the memory modules 8a, 8b.

If the memory modules 8a, 8b support different DRAM protocols, then the host memory controller 6 is configured to communicate using different protocols over the bus 10, a first protocol specific to the memory module 8a, e.g., DDR4, and a second memory protocol specific to the memory module 8b. Read and management requests to the memory module 8a are implemented with the first memory protocol and to the second memory module 8b using the second memory protocol.

Figure 2:
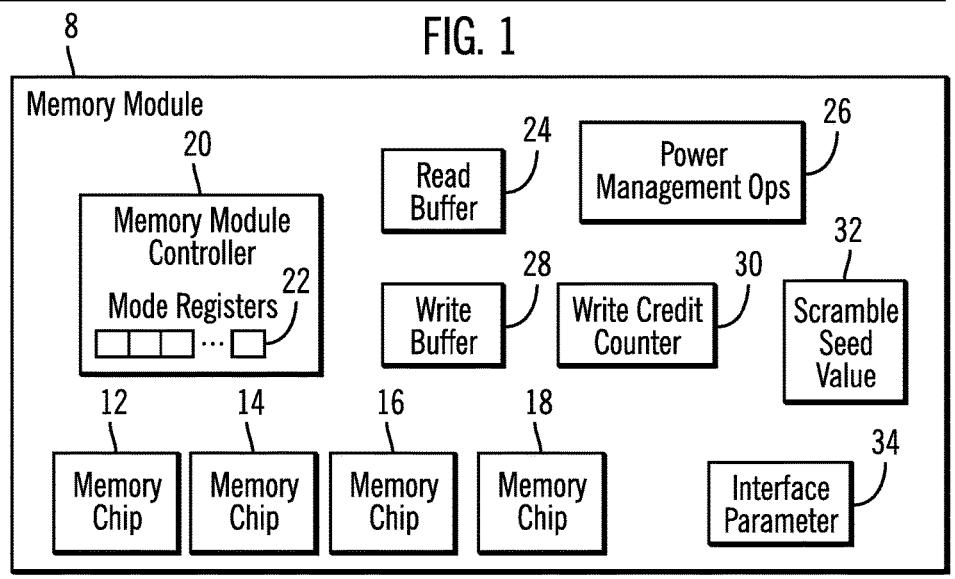
FIG. 2 illustrates an embodiment of a memory module.

FIG. 2 provides further details of an embodiment of a memory module 8, such as the memory modules 8a, 8b, as including a memory module controller 20 performing the memory module operations and interactions with the host memory controller 6. In certain implementations, one of the memory modules, e.g., 8b, may include the memory module of FIG. 2, and the other memory module, e.g., 8a, may not include the memory module controller 20, such as a memory module 8a conforming to the DDR4 standard. In such embodiments, the memory module 8a, may include a register, such as the case with a RDIMM or a buffer, such as the case with a LRDIMM.

The memory module 8 may include mode registers 22 in the memory module controller having data which may be configured using a Mode Register Set (MRS) command, a read buffer 24 to buffer read data being returned to the host memory controller 6 in response to a read command, a power management operations register 26 indicating power management operations to perform, a write buffer 28 to buffer write data before being written to the memory chips 12, 14, 16, 18, a write credit counter 30 indicating a number of write credits to return to the host memory controller 6, a scramble seed value 32 used to randomize read data transferred over the bus 10 to the host memory controller 6, and an interface parameter 34 identifying a supported interface configuration of the bus 10. The buffers and parameters 24, 26, 28, 30, 32, and 34 may be implemented within the memory module controller 20 or in circuitry external to the memory module controller 20 in the memory module 8. Certain of the parameters 26, 30, 32, and 34 may be implemented in mode registers 22.

In certain embodiments, the memory module 8a may comprise a near memory that is configured as a caching layer for a far memory comprising memory module 8b. In such configuration, the near memory module 8a should have the effect of reducing the access times of the most frequently accessed system memory addresses that the specific far memory module 8b is designed to cache. The near memory devices may be configured as a direct mapped cache for their far memory counterparts.

The described memory module controller 20 and host memory controller 6 embodiments may be encoded in hardware logic, such as in an Application Specific Integrated Circuit (ASIC), Field Programmable Gate Array (FPGA), etc.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of a network transmission.

Figure 3:
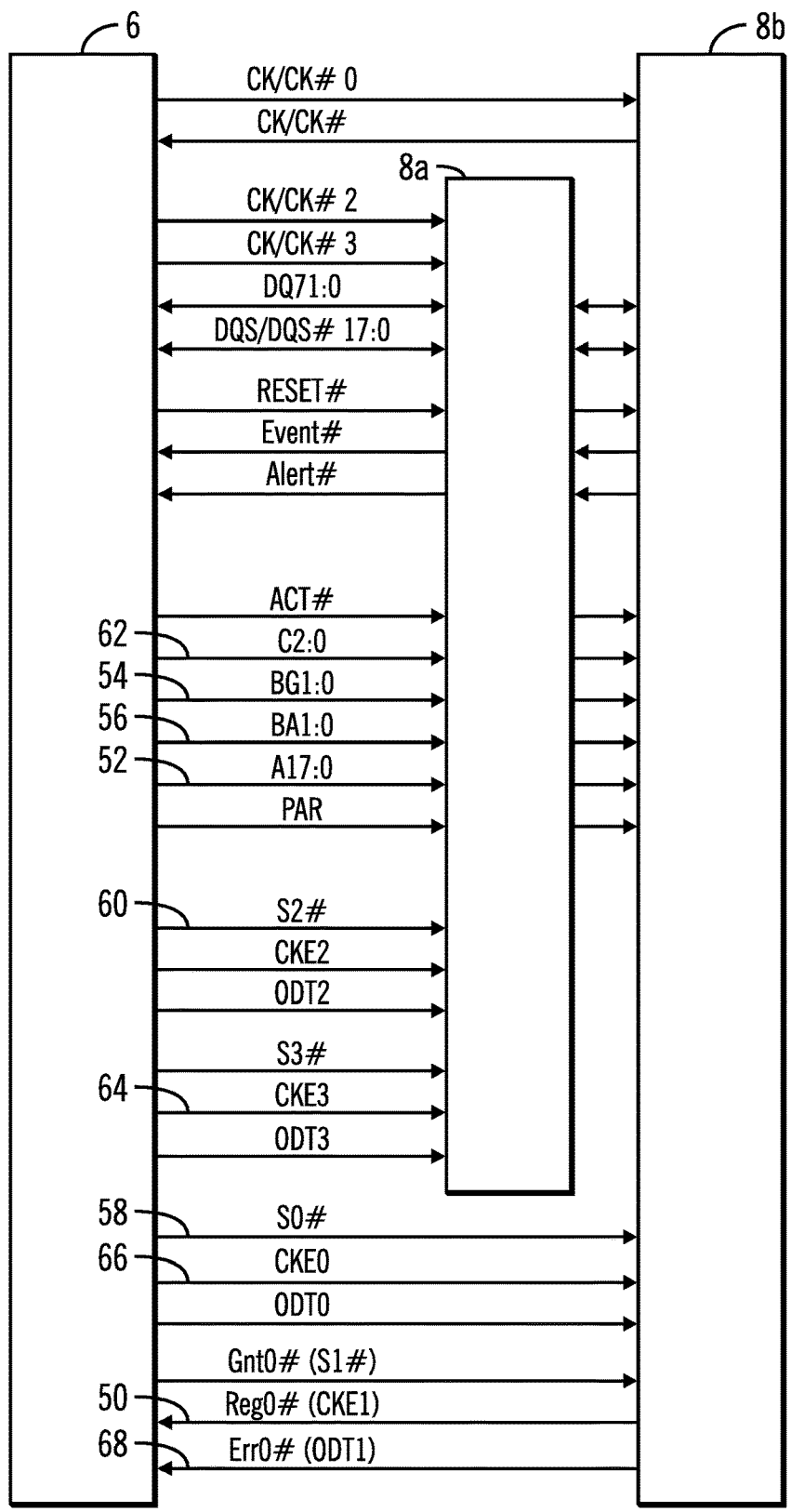
FIG. 3 illustrates an embodiment of a pin-out design of the memory system.

FIG. 3 illustrates an arrangement of the pins on the memory module 8a, 8b, with the host memory controller 6, bus 10 lines and the memory modules 8a, 8b, where such pin designations are described below or known in the art.

Encoding Functions in a Request Signal

In certain embodiments, the memory module controller 20 may send a request signal, e.g., REQ#50, to the host memory controller 6 to indicate that there is data in the read buffer 24 for the host memory controller 6 to return as part of a read command. The request signal may comprise the REQ# clock enable (CKE) signal 50 shown in the pin-out diagram of FIG. 3. The memory module controller 18 may transmit the request signal at a minimum pulse width to guarantee detection by the host memory controller 6, which in certain implementations may comprise two clock cycles. The memory module controller 20 may further encode an additional function in the request signal for the host memory controller 6 to perform. By encoding additional functions in the request signal, multiple functions may be indicated in one signal in order to maximize the number of operations and information communicated in a single signal.

Figure 4:
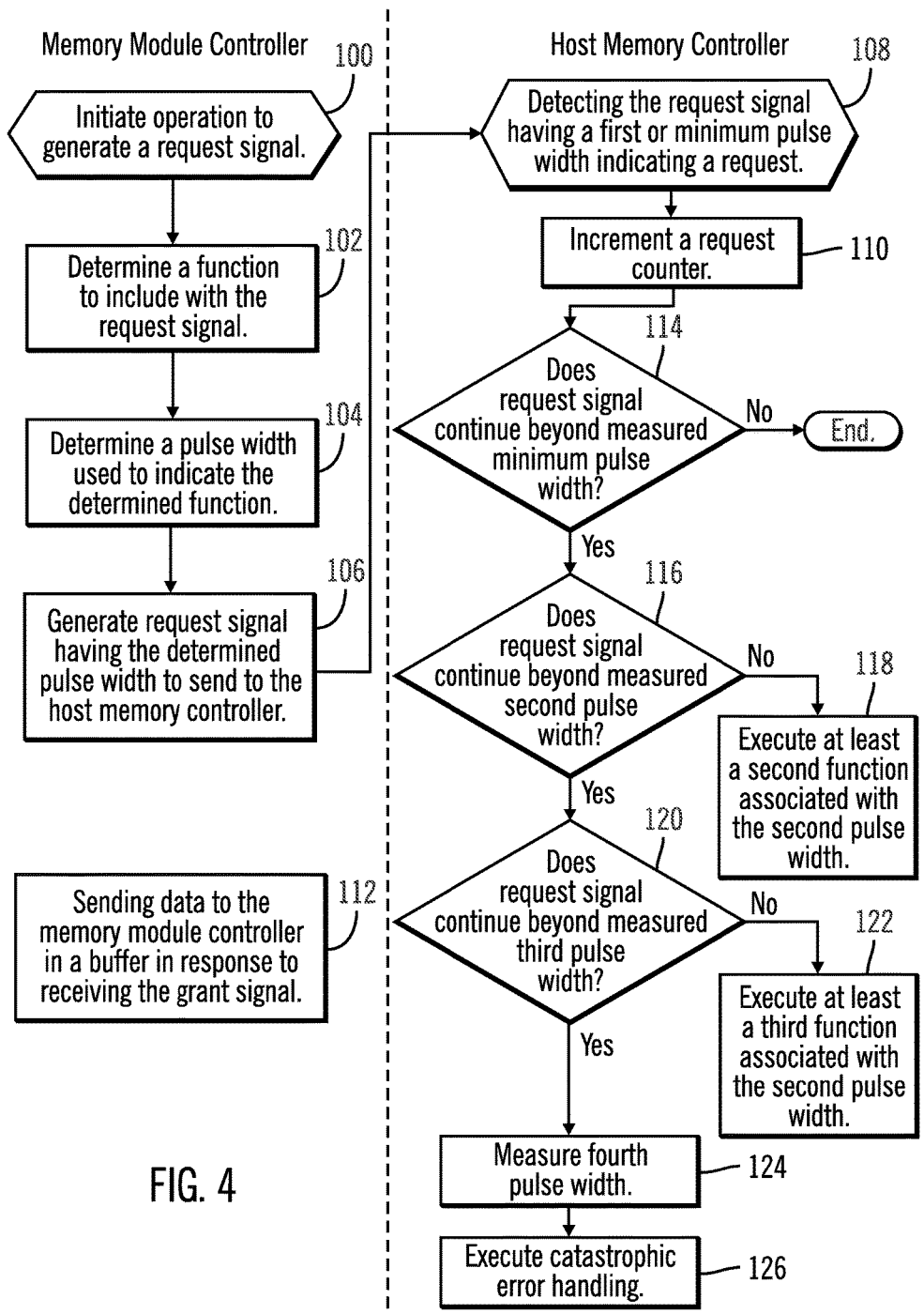
FIG. 4 is an embodiment of operations to generate and process a request signal encoding a function.

FIG. 4 illustrates an embodiment of operations performed by the host memory controller 6 and memory module controller 20 to use the request signal to communicate additional functions to the host memory controller 6. Upon initiating (at block 100) an operation to generate a request signal, which may be part of a read command to transfer data from the read buffer 24 back to the host memory controller 6, the memory module controller 20 determines (at block 102) a function to include with the request signal, which function may indicate additional operations for the host memory controller 6 to perform, such as a specific error condition or interrupt or other functions. The memory module controller 20 then determines (at block 104) a pulse width used to indicate or encode the determined function. For instance a pulse width equal to the minimum pulse width to guarantee detection by the host memory controller 6 of the request signal may be used to indicate or encode a first function, additional pulse widths that are greater than the minimum pulse width may be used to indicate additional functions. For instance, if the minimum pulse width to guarantee detection is two clocks, then this minimum pulse width for the request signal may indicate one function, and pulse widths of 6, 10, and 14 may indicate yet additional different functions. A pulse width of 14 may indicate a catastrophic failure. Further, the different pulse widths for the request signal associated with different functions may be separated by a minimum number of clock cycles, such as 3 cycles in certain embodiments, to guarantee proper detection by the host memory controller 6 of the pulse width. The memory module controller 20 generates (at block 106) the request signal having the determined pulse width to send to the host memory controller 6.

Upon detecting (at block 108) the request signal REQ0# on pin 50 having the minimum or first pulse width, e.g., 2 clocks, the host memory controller 6 increments (at block 110) a request counter 7 indicating a number of grant signals that need to be sent to the memory module 8b sending the request signal. After incrementing the request counter 7, the host memory controller 6 may wait until a slot on the bus 10, i.e., data bus, is available to issue multiple of the grant request, such that the requests indicated in the request counter 7 are processed in a batch at different random times. Upon receiving the grant signal, the memory module controller 20 sends (at block 112) data in the read buffer 24 to the host memory controller 6, such as data gathered and buffered in response to a read request from the host memory controller 6.

After determining the minimum or first pulse width of the request signal 50, if the request signal 50 (at block 114) does not continue beyond the measured minimum pulse width, then control ends. Otherwise, if (at block 116) the measured request signal does not continue beyond a second pulse width, e.g., 6 clocks, then the host memory controller 6 may execute (at block 118) a second function associated with that second pulse width. Otherwise, if (at block 120) the request signal 50 does not continue beyond a measured third pulse width, e.g., 10 clocks, then the host memory controller 6 may execute (at block 122) a third function associated with that third pulse width. If the pulse width continues and a fourth pulse width, e.g., 14 clocks, is measured (at block 124), then the host memory controller 6 may execute (at block 126) catastrophic failure handling for the host memory controller 6 to perform.

Although the described embodiments concern four functions for four different pulse widths of the request signal, in certain implementations there may be more or less than four functions represented by more or less than four pulse widths. Further, one pulse width may indicate a set of multiple functions to perform.

In the operations of FIG. 4, the functions beyond the initial request grant function are only processed after determining that the pulse width does not continue beyond the pulse width associated with those additional functions. In an alternative embodiment, each additional function may execute upon measuring the pulse width associated with that function even if the pulse width continues beyond that measured pulse width, so each function is executed as measurements of the pulse width extend beyond the trigger pulse width.

With the described embodiment of FIG. 4, different functions may be encoded into a request signal by the memory module controller 20 by using different pulse widths for the memory module controller that may be separated by a minimum number of clocks that guarantee detection of the pulse width by the host memory controller 6. In this way, in a single request signal, the memory module controller 20 may signal a request signal, such as a request to return data from the read buffer 24, and one of a plurality of different functions.

Adjusting the Timing of Output from a First Memory Module Based on Component Differences with a Second Memory Module to Match the Timing from the Second Memory Module In certain implementations, the memory modules 8a and 8b may comprise different types of memory modules that have different components. For instance, the memory module 8a may or may not include registers and data buffers not included in the memory module 8b, and vice versa, and the memory modules 8a, 8b may support different memory protocols. Described embodiments provide techniques for one memory module, such as 8b, to adjust its timing to match that of the other memory module, e.g., 8a, so that the host memory controller 6 does not have to adjust for different timings from different memory modules, such as different types of DIMMs. By having the memory module controller 20a, 20b handle the timing adjustments, excessive turnaround cycles and performance loss at the host memory controller is avoided.

Figure 5:
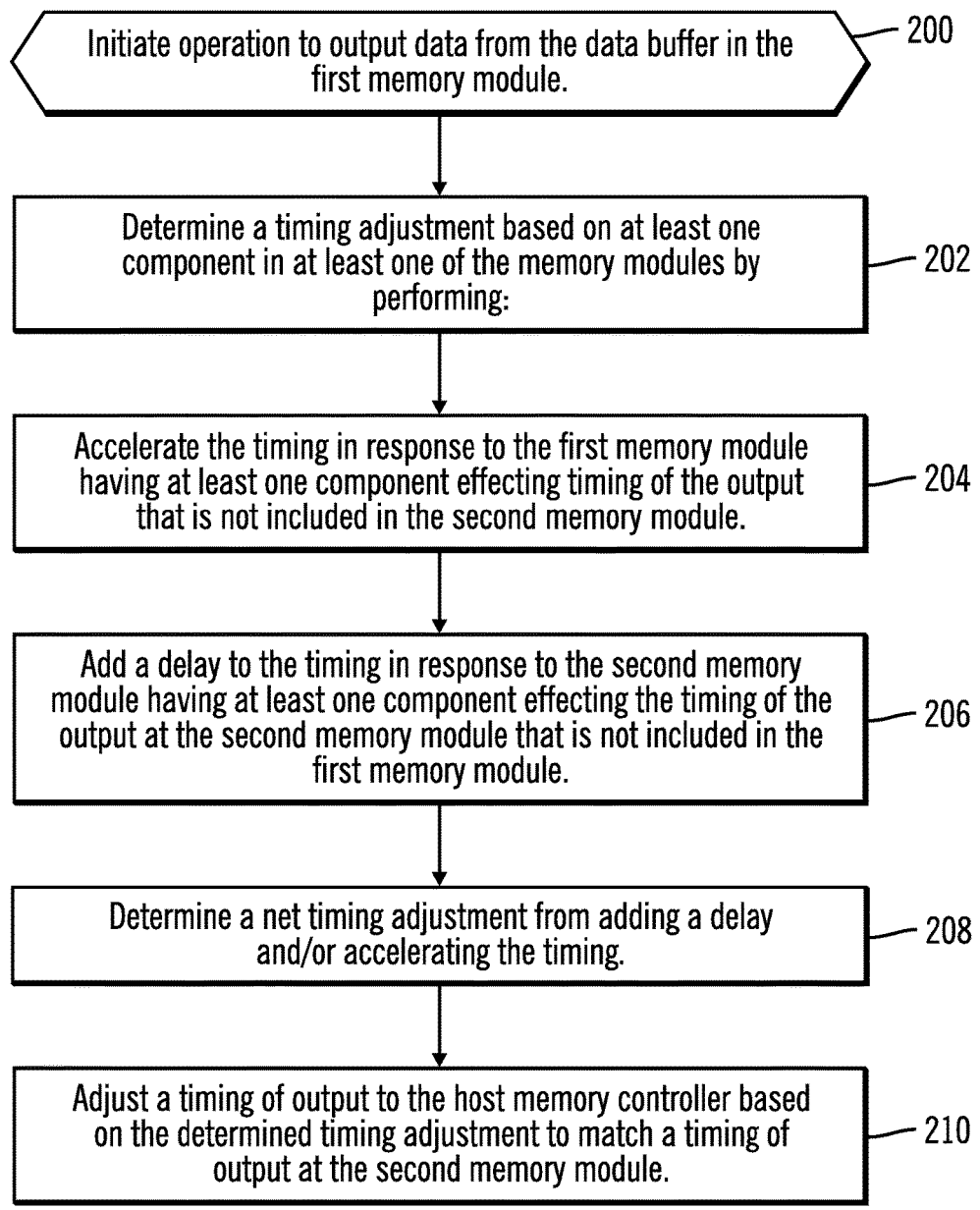
FIG. 5 illustrates an embodiment of operations go determine a timing adjustment for output in a memory module.

FIG. 5 illustrates an embodiment of operations performed by the memory module controller 20, such as memory module controller 20b, to adjust the timing of output based on component differences with other memory modules 8a, 8b on the bus 10. Upon initiating (at block 200) an operation to output data from the data buffer 24, the memory module controller 20b determines (at block 202) a timing adjustment based on at least one component in at least one of the memory modules 8a, 8b on the channel. Blocks 204-208 provide an embodiment of operations to determine the timing adjustment. The memory module controller 20b may accelerate (at block 204) the timing in response to the first memory module 8b having at least one component effecting timing of the output that is not included in the other second memory module 8a. Further, a delay may be added (at block 206) to the timing in response to the other second memory module 8a on the bus 10 having at least one component effecting the timing of the output at the second memory module 8b that is not included in the first memory module 8b.

The memory module controller 20b may then determine (at block 208) a net timing adjustment from any added delay or acceleration of the timing. The memory module controller 20b adjusts (at block 210) a timing of output from the data buffer 24 to the host memory controller 6 based on the determined timing adjustment to match a timing of output at the second memory module 8a.

For instance, if the memory module 8b including the controller 8b performing the calculations includes a data buffer 24 not found in the other memory module 8a, then the timing adjustment may comprise accelerating the timing of the output when the other second memory module 8a does not include a data buffer such as included in the first memory module 8b. In another implementation, if the other memory module 8a has a register not included in the memory module 8b performing the calculation, such as the case with an RDIMM, then the timing adjustment comprises delaying the timing of the output to accommodate for the register in the other memory module 8a not included in the memory module 8b doing the calculation. If the acceleration of timing for the data buffer 24 was greater than the delay added for the register in the other memory module 8a, then the net timing adjustment would comprise an acceleration of the timing. Likewise, if the delay added is greater than the acceleration, then the net adjustment would comprise adding a delay to the timing. If the memory module 8b doing the calculations does not include registers or data buffers 24 included in the other memory module, such as if the other memory module 8a is an RDIMM and LRDIMM, then the memory module controller 20b may delay the timing to account for delays caused by the additional components in the other memory module 8a.

The memory modules 8a, 8b may have different types of components on their command, address and control busses to the bus 10 if they comprise different types of DIMMs, such as UDIMMs, RDIMMs, and LRDIMMs.

In certain described embodiments, the output for which timing is adjusted comprises the output of data on a data bus in the bus 10 from the data buffer 24. In alternative embodiments, the output signals adjusted may comprise output other than data output.

Although operations are described with respect to one memory module performing timing adjustments, one or multiple memory modules 8a, 8b on the bus 10 may perform the timing adjustments of FIG. 5.

With the described timing adjustments, the memory module controller 20b may adjust the timing of its output, such as output from a data buffer 24, to match the timing from the other memory module 8a for similar types of outputs so that the host memory controller 6 does not need to perform any of the timing adjustments to accommodate for the different configurations of the different memory modules 8a, 8b on the bus 10.

Encoding Use of Registers in a Mode Register Set (MRS) Command

The memory module controller 20 may include mode registers 22. In certain embodiments, the memory module controller 20b may implement a first protocol that is different than a second memory protocol used in other controller 8a, such as DDR 4. However, the memory module controller 20b may support certain commands from the second protocol of the other memory module 8a, such as DDR4, such as the Mode Register Set (MRS) command, yet use the command for a different purpose than used by the memory module controller 20*a* implementing the first memory protocol.

Figure 6:
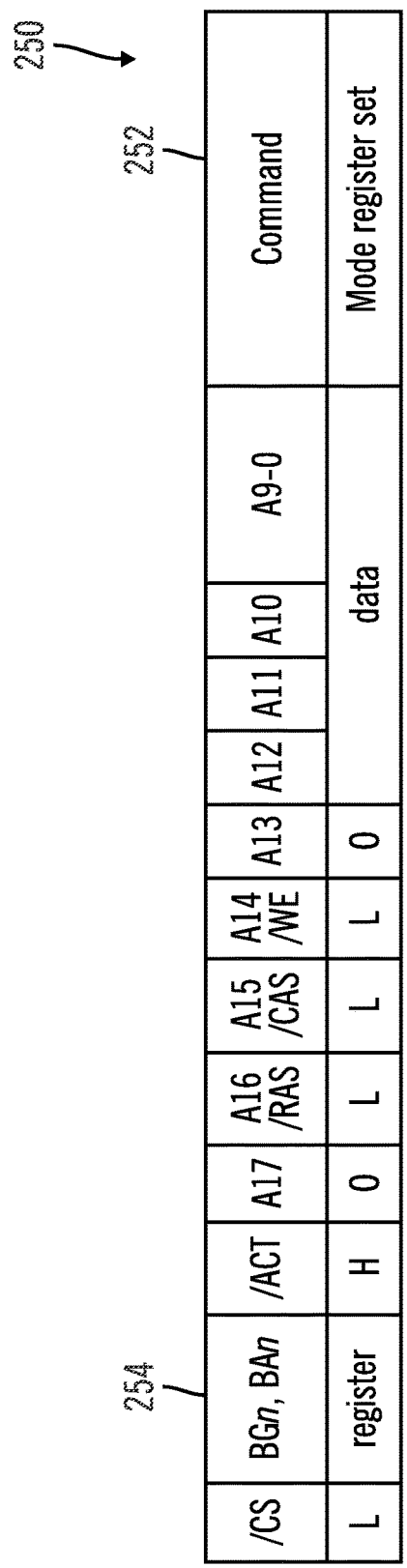
FIG. 6 illustrates an embodiment of a mode register set (MRS) command.

FIG. 6 illustrates an embodiment of the MRS command 250, which may or may not include MRS fields from another memory protocol, such as DDR4. The command 250 specifies an operation code 252 indicating the MRS operation. The address registers A0-A13 may be used to provide data for one of the mode registers 22 in the memory module controller 20 and the register bits 254 indicate the mode register 22 to which to write the data in addresses A0-A13. For instance, if there are 16 mode registers 22, then four register bits 254, such as BA0, BA1, BG0, BG1, may indicate one of the 16 mode registers 22 in the memory module controller 20 to use.

In one embodiment, the MRS command 250 may comprise a single cycle command that may be used to provide configuration parameters to the memory module 8 before the bus 10 is trained for bus operations, such as read and write operations that may comprise two cycle commands. In this way, the MRS command 250 uses address input signals A0-A17, shown in the pin-out design of FIG. 3 as line 52 and command input signals BG1:0 and BA1:0, shown as lines 54 and 56, respectively, in the pin-out design of FIG. 3. In certain embodiments, address input signals A14-16 contain the MRS command operation code.

Figure 7:
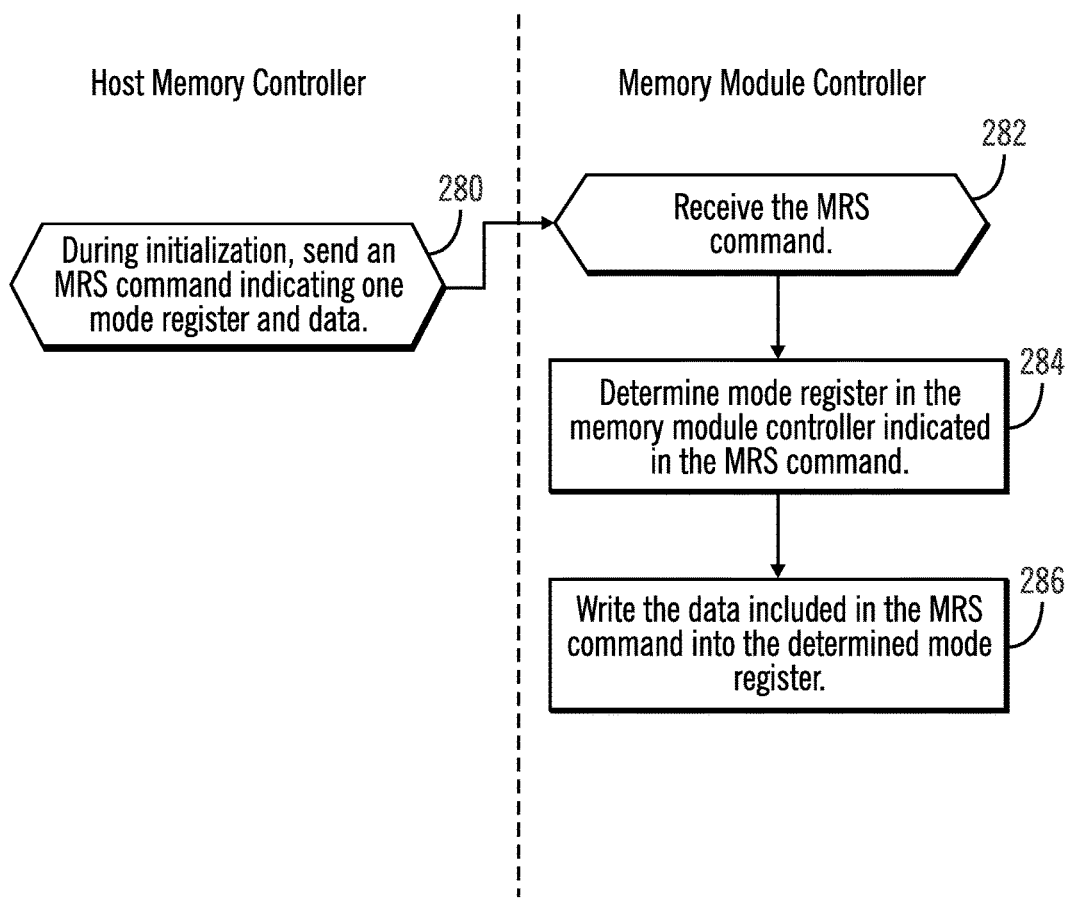
FIG. 7 illustrates an embodiment of operations for generating and processing the MRS command.

FIG. 7 illustrates an embodiment of operations performed by the host memory controller 6 and the memory module controller 20 to program mode registers 22 in the memory module controller 20. During initialization, such as before the bus 10 is trained for read and operations, which may comprise commands sent in two clocks, the host memory controller 6 may generate (at block 280) and send an MRS command 250 to indicate a mode register 22 in the memory module controller 20 to configure with data included in the address fields A13:0, which MRS command 250 may be sent on one clock cycle.

The memory module controller 20 receives (at block 282) the MRS command 250 and determines (at block 284) the mode register 22 indicated in the register bits 254 on lines 34 and 35 (FIG. 3). The memory module controller 20 then writes (at block 286) the data provided in the address bits A0:A13 into the determined mode register 22.

The host memory controller 6 may further use the MRS command 250 according to the DDR4 protocol to send to a memory module, e.g., memory module 8*a*, implementing the DDR4 protocol, to program one of eight mode register on one of the memory chips 12*a*, 14*a*, 16*a*, 18*a*, where the register bits BA0, BA1, BG0 identify the mode register in the memory chip and the bit BG1 indicates whether the bits are inverted. In this way, the host memory controller 6 may use the same MRS command format for memory controllers 20*a*, 20*b* implementing different memory protocols to cause different operations according to the different protocols. For instance, when the MRS command 250 is used for a memory module 8*a* supporting DDR4, the MRS command 250 writes data to a mode register in one of the memory chips 12*a*, 14*a*, 16*a*, 18*a*. When used for a memory module 8*b* having mode registers 22 in the memory module controller 20, the MRS command 250 writes data to mode registers 22 in the memory module controller 20 and not the DRAM chips 12, 14, 16, 18. In this way, the host memory controller 6 may use the same MRS command format with memory modules supporting different memory protocols, e.g., DDR4 and some other protocol.

Accepting by a Memory Module a Second Half of a Command When a Chip Select Signal is Only Received for a First Half of the Command Described embodiments provide techniques for a memory module to accept a command in multiple parts, such as in two halves, with only having to accept one chip select signal for the memory module 8 so that the memory module 8 automatically accepts the second half of the command at a delay interval from when the first half of the command was sent. Further embodiments provide techniques for incorporating a delay so as to automatically accept the second half of the command in a high speed timing mode, e.g., 2N timing, when the memory module 8*a*, 8*b* is operating at higher speeds as opposed to a regular timing mode, e.g., 1N timing.

In certain embodiments, commands occupy two bits per lane and are sent on back-to-back clocks. This allows the entire address to be sent in one command instead of two, such as sending row and column information in one command. The memory module controller 20 is made aware of the high speed (2N) timing mode through the host memory controller 6 programming the mode registers 22 on the memory module controller 20.

Figure 8:
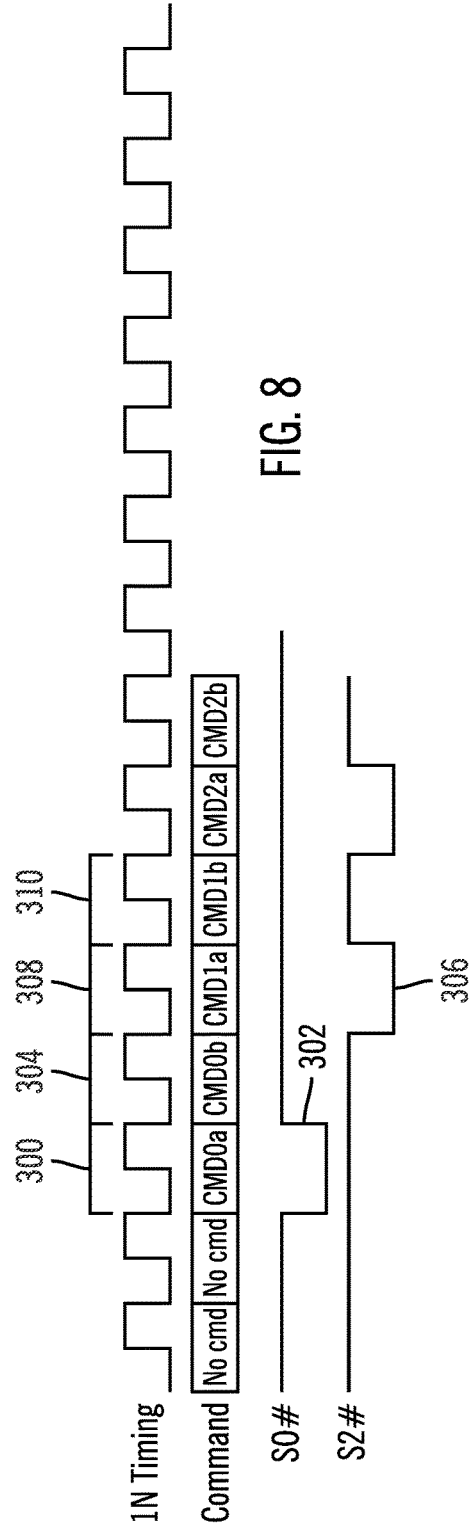
FIGS. 8 and 9 provide timing charts for outputting a command in two parts.

FIG. 8 provides an embodiment of a timing chart for a regular timing mode, e.g., 1N timing, for commands, such as read commands, which are sent in two parts, shown as CMD0*a*, CMD0*b*, CMD1*a*, CMD1*b*, CMD2*a*, CMD2*b*. The host memory controller 6 may put a first half of the command CMD0*a* and a chip select signal S0#302, also shown as S0# line 58 in FIG. 3, on the bus on a clock cycle 300 for a first memory module 8*a*. The first memory module 8*a* may accept the first half of the command CMD0*a* on cycle 300 upon receiving the chip select signal 302 and may further automatically accept the second half of the command CMD0*b* at a delay interval from the first half of the command CMD0*a*, such as one clock cycle later at clock cycle 304.

The host memory controller 6 may put a first half of the command CMD1*a* and a chip select signal S2#306, also shown as S2# line 60 in FIG. 3, on the bus on a clock cycle 308 to select a second memory module 8*b*. The second memory module 8*b* may accept the first half of the command CMD1*a* at cycle 308 upon receiving the chip select signal 306 and may further automatically accept the second half of the command CMD1*b* one clock cycle later at cycle 310.

Figure 9:
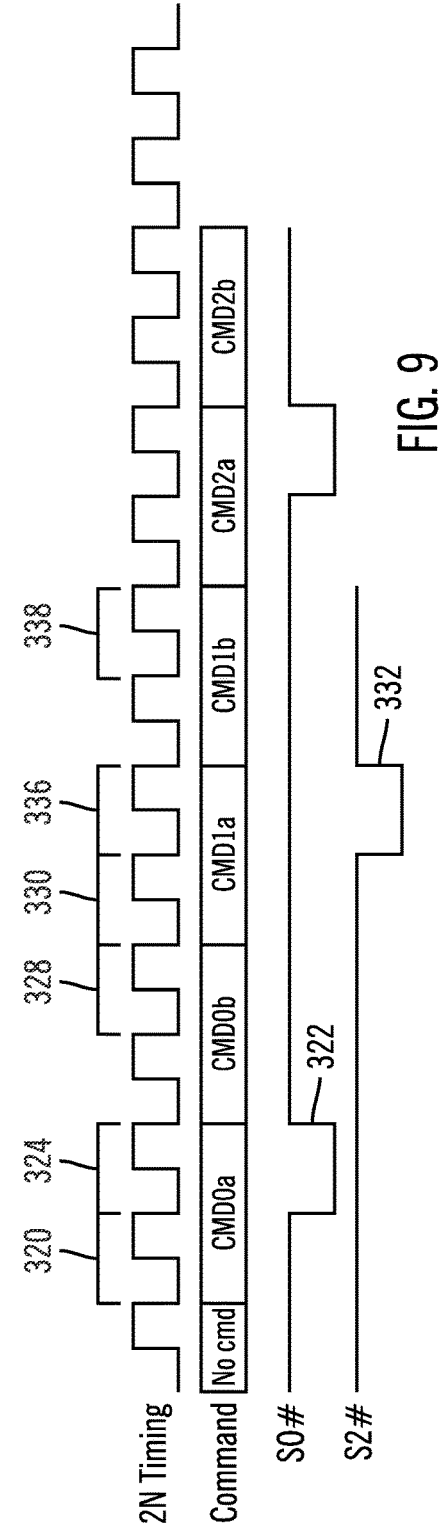

FIG. 9 provides an embodiment of a timing chart for a high speed timing mode for higher speeds than regular timing, e.g., 2N timing, where both parts of each command, shown as CMD0*a*, CMD0*b*, CMD1*a*, CMD1*b*, CMD2*a*, CMD2*b*, remain on the bus 10 for two clock cycles. The host memory controller 6 may put a first half of the command CMD0*a* on the bus on a clock cycle 320 for two cycles and place a chip select signal S0#322, also shown as S0# line 38 in FIG. 3, on the bus on a clock cycle 324 for the first memory module 8*a* one cycle from when the first half of the command CMD0*a* was placed on the bus 10, thus delaying the chip select signal in high speed timing mode. The first memory module 8*a* may accept the first half of the command CMD0*a* at the clock cycle 324 on receiving the chip select signal 322 and may further automatically accept the second half of the command CMD0*b* a delay interval, shown as two clock cycles from the chip select signal 322, at the beginning of clock cycle 328.

The host memory controller 6 may put a first half of the command CMD1*a* out on cycle 330 and a chip select signal S2#332, also shown as S2# line 60 in FIG. 3, one cycle later on cycle 332 for a second memory module 8b. The second memory module 8b may accept the first half of the command CMD1a on the clock cycle 336 of the chip select signal 332 and may further automatically read the second half of the command CMD1b two clock cycles later at cycle 338. In this way, the host memory controller 6 delays the chip signal one clock cycle halfway through the first half of the command and the memory module controller 20 delays reading the second half of the command two cycles after reading the first half of the command.

Figure 10:
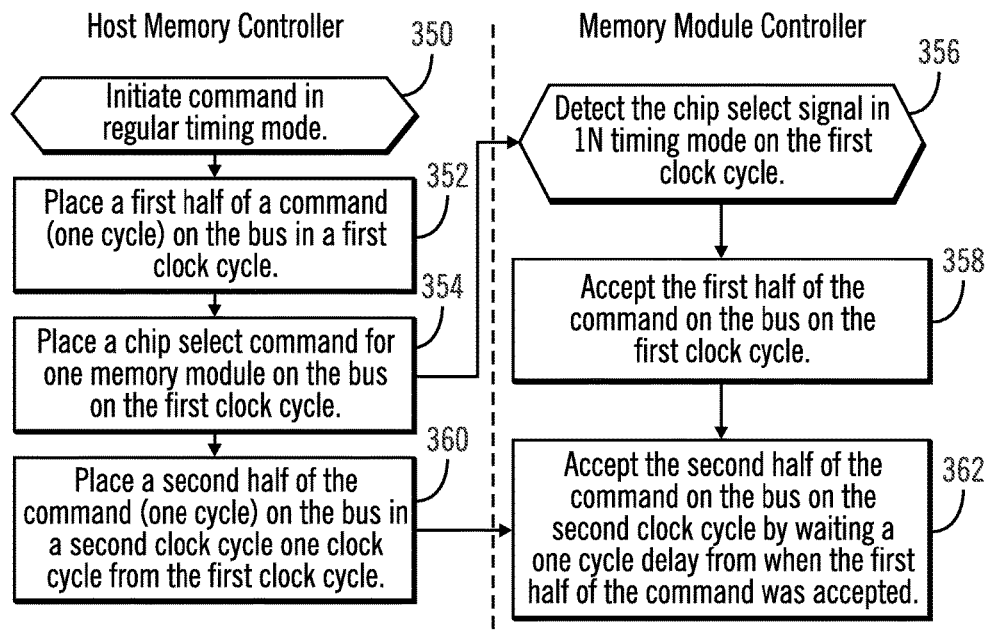
FIGS. 10 and 11 illustrate embodiments of operations for generating and accepting a command sent on multiple clock cycles.

FIG. 10 illustrates an embodiment of operations performed by the host memory controller 6 and the memory module controller 20 for a 1N timing mode for commands occupying two bits on back-to-back cycles. The host memory controller 6 may program the memory module controller 20 through bits in the mode registers 22 during initialization to operate in 1N timing mode. Upon initiating (at block 350) a two cycle command in regular timing mode, 1N, the host memory controller 6 places (at block 352) a first half of a command (one cycle) on the bus 10 in a first clock cycle. A chip select command is also placed (at block 354) on the bus 10 on the first clock cycle. Upon the memory module controller 20 detecting (at block 356) the chip select signal directed to the specific memory module 8 including the memory module controller 20 when programmed in regular timing mode, the memory module controller 20 accepts (at block 358) the first half of the command on the bus 10 on the first clock cycle.

Further, the host memory controller 6 places (at block 360) a second half of the command (on a back-to-back cycle from the first half) on the bus 10 in a second clock cycle one clock cycle from the first clock cycle. The memory module 8 selected by the chip select signal accepts (at block 362) the second half of the command on the bus 10 on the second clock cycle by waiting a one cycle delay from when the chip select signal was received and the first half of the command accepted. The memory module controller 20 may automatically accept the second half of the command on the bus 10 without requiring a chip select signal to access the bus 10.

Figure 11:
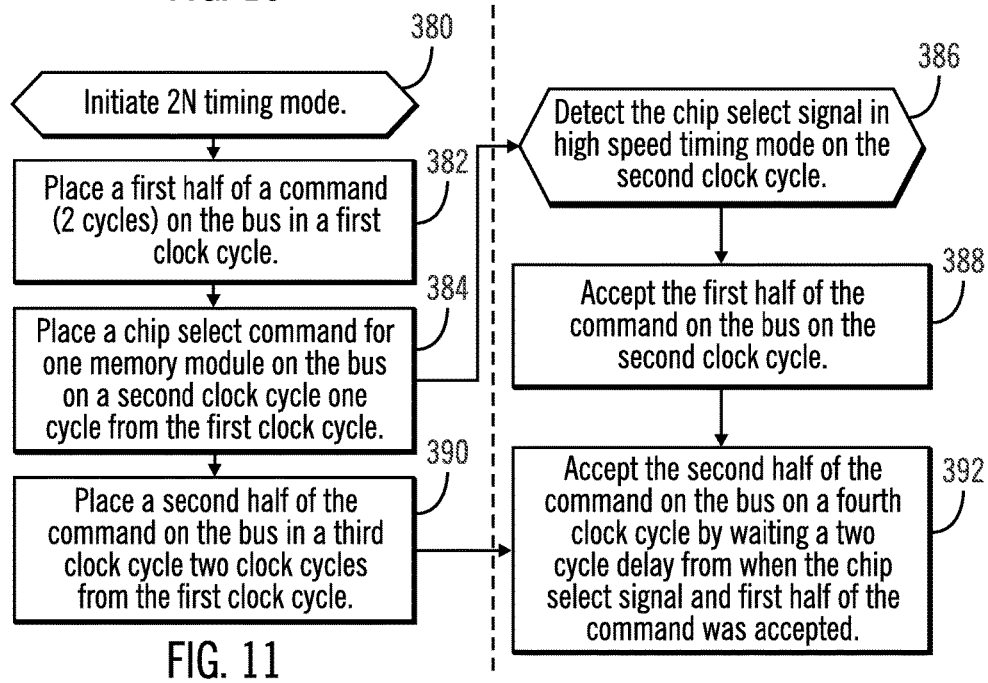

FIG. 11 illustrates an embodiment of operations performed by the host memory controller 6 and the memory module controller 20 for a high speed timing mode, e.g., 2N, for commands occupying two bits on back-to-back cycles. The memory module controller 20 may be programmed through bits in the mode registers 22 during initialization to operate in high speed timing mode. Upon initiating (at block 380) a two cycle command in high speed timing mode, the host memory controller 6 places (at block 382) a first half of a command (one cycle) on the bus 10 in a first clock cycle. A chip select signal is then placed (at block 384) on the bus 10 on a second clock cycle which may be one clock cycle from the first clock cycle. In this way, the chip select signal is placed on the bus at a delay, such as one clock cycle, from placing the first half of the command. Upon the memory module controller 20 detecting (at block 386) the chip select signal directed to the specific module 8 when programmed in high speed timing mode, the memory module controller 20 accepts (at block 388) the first half of the command on the bus 10 on the second clock cycle at a delay.

Further, the host memory controller 6 places (at block 390) a second half of the command (two cycles from the first half) on the bus 10 in a third clock cycle two cycles from the first clock cycle. The memory module controller 20 in the memory module 8 selected by the chip select signal accepts (at block 392) the second half of the command on the bus 10 on a fourth clock cycle by waiting a two cycle delay from when the chip select signal was received and the first half of the command accepted. The memory module controller 20 may automatically accept the second half of the command without waiting for a chip select signal on the bus 10.

The described embodiments provide for the chip select signal to be delayed by one clock signal in the high speed timing mode, e.g., 2N timing, from sending the first half of the command. Further, the memory module may automatically accept the second half of the command two clock signals after the chip select signal. This delay in the chip select signal allows for additional setup time in high speed mode. The delay for accepting the second half of the command allows for automatic acceptance of the command without requiring a chip select signal.

In alternative embodiments, the chip select signal may be placed on the bus and the second half of the command may be accepted at intervals different than the described one clock signal. Further, in alternative embodiments, the commands may be comprised of more than two parts (e.g., bits) and use more than two clock cycles and the memory module 8a, 8b may automatically accept more than one additional part of the command at clock signal delay intervals from the chip select signal without requiring additional chip select signals to accept.

Determining How to Set High Address Bits in a Memory Module

The memory module controller 20 may be configured to operate in memory modules 8 having different pin and interface configurations, such as one memory module having more pins for addressing than another memory module having fewer pins, such as an SO-DIMM. The memory module with fewer addressing pins may provide a smaller address space than a memory module having more pins available for addressing. The supported interface configuration may vary due to the capabilities of the hot memory controller 6 and the bus 10 or vary due to the capabilities of the pin and interface configuration of the memory module 8, such as being an SO-DIMM or UDIMM.

For such embodiments, the memory module controller 20 may use one of the mode registers 22 to indicate supported interface configurations, such as indicating whether the memory module has pins available for high address bits or not. In such case, if the memory module controller 20 is operating in a module 8 not having one or more pins for high address bits available in other memory modules, then the memory module controller 20 would use a predetermined value, such as zero, for those high address bits unavailable in the module. In this way, the memory module controller 20 assumes a value of zero for the high address bits when there are no pins for receiving values for those high address bits. In one embodiment, the high address bits may comprise address bit A17 52 and bit C2:0 62 shown in the pin-out diagram of FIG. 3. Certain memory modules, such as an SO-DIMM, may not include pins 52 and 62.

Figure 12:
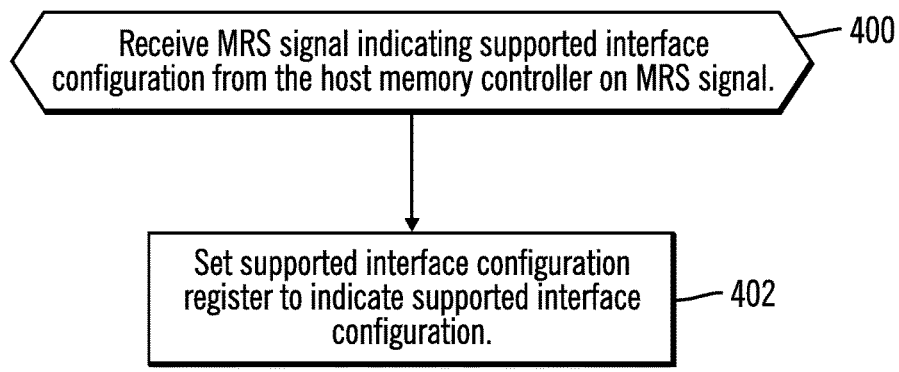
FIG. 12 illustrates an embodiment of operations to indicate a supported interface configuration to the memory module controller.

FIG. 12 illustrates an embodiment of operations performed by the memory module controller 20 to configure settings for addressing. The host memory controller 6 may send an MRS signal to the memory module 8 indicating the supported interface configuration. Upon receiving (at block 400) the MRS signal indicating the supported interface configuration, the memory module controller 20 may update the mode register 22 addressed by the MRS signal to indicate the supported interface configuration, which may indicate the DIMM type, e.g., SO-DIMM, UDIMM, etc. or indicate what the interface supports, e.g., that the high address bits are supported or not. In response, the memory module controller 20 sets (at block 402) the addressed mode register 22 indicating the interface configuration to indicate the communicated interface configuration, such as indicating whether high address bits are supported or not.

Figure 13:
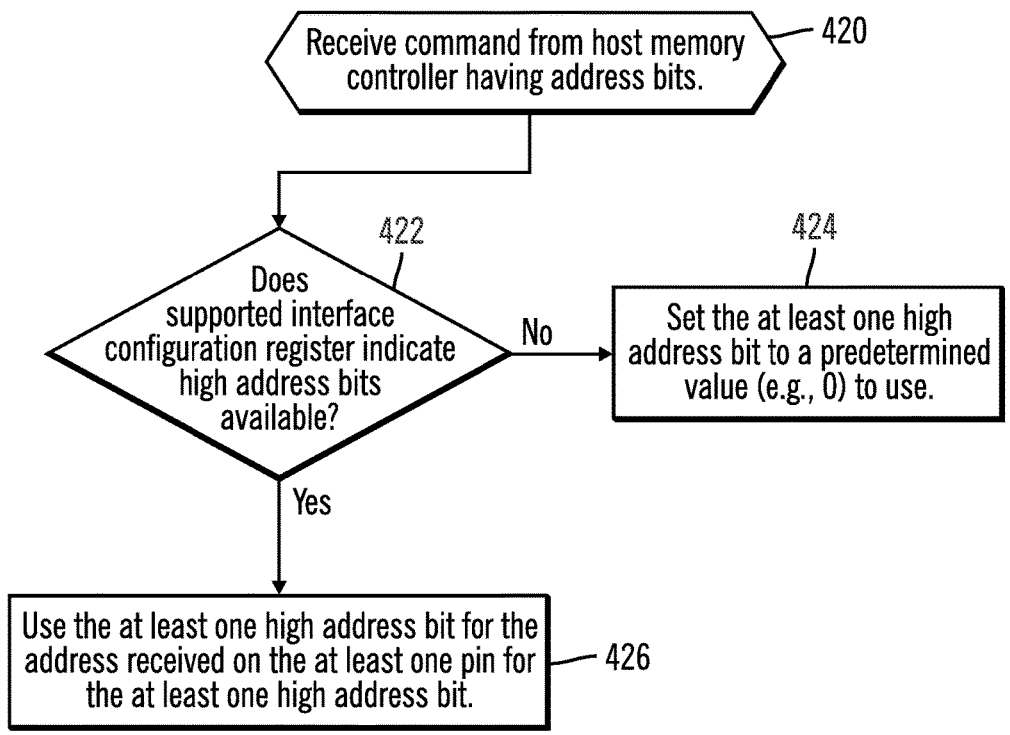
FIG. 13 illustrates an embodiment of operations for the memory module controller to use address bits based on a supported interface configuration.

FIG. 13 illustrates an embodiment of operations performed by the memory module controller 20 to handle addressing using the higher level address bits. Upon receiving (at block 420) a command from the host memory controller 6 having address bits, the memory module controller 20 determines the supported interface configuration from the mode register 22, which information indicates whether the current memory module 8 supports addressing at the high address bits. If (at block 422) the supported interface configuration does not support high address bits, e.g., the memory module 8 does not have pins 52 and 62, then the at least one high address bits for the received address are set to be a predetermined value, i.e., the high address bits are assumed to be zero when there are no pins for the high address bits. If (at block 422) the supported interface configuration indicated in the mode register 22 indicates high address bits are available, then the memory module controller 20 uses (at block 426) the at least one high address bit for the address received on the at least one high address pin 52, 62.

In alternative embodiments, the memory module controller 20 may supply predetermined values for address bits other than the high address bits not having pins on the memory module.

The described embodiments allow a memory module controller to operate within memory modules having different pin configurations available for addressing to provide high order address bits for a memory module configuration not having pins to provide high address bits. In this way, the memory module controller may be deployed and operate in memory modules such as an SO-DIMM and UDIMM and provide the full addressing capabilities for both interface configurations.

Providing Extended Operations for a CKE Low Signal

Described embodiments provide techniques to allow the pre-configuration of power management operations in a memory module 8 that are to be performed at a later time when the memory module controller detects a clock enable (CKE) low signal on a CKE pin, such as the pins 64 or 66 shown in the pin-out diagram of FIG. 3. This allows an extended series of power management operations to be performed upon activation of the CKE low signal, such as to enter a predefined sleep state.

Different possible sleep states could be activated upon receiving the CKE low signal depending on the previously sent pre-CKE command. Such indicated states may comprise those specified in the Advanced Configuration and Power Interface ("ACPI") Specification, such as an S 3 state of standby, sleep or suspend to the memory module 8, which remains powered at a lower level, an S 4 state of hibernation where the content of the memory module 8 is saved to a non-volatile memory and the memory module 8 is powered-down, and an S 5 state, where the memory module 8 is powered-down while a minimum amount of power is supplied to the power supply unit. The non-volatile memory to which content is saved, may come in various forms, including but not limited to NAND (flash) memory, ferroelectric random-access memory (FeTRAM), nanowire-based non-volatile memory, three-dimensional (3D) crosspoint memory such as phase change memory (PCM), memory that incorporates memristor technology, Magnetoresistive random-access memory (MRAM), Spin Transfer Torque (STT)-MRAM.

Figure 14:
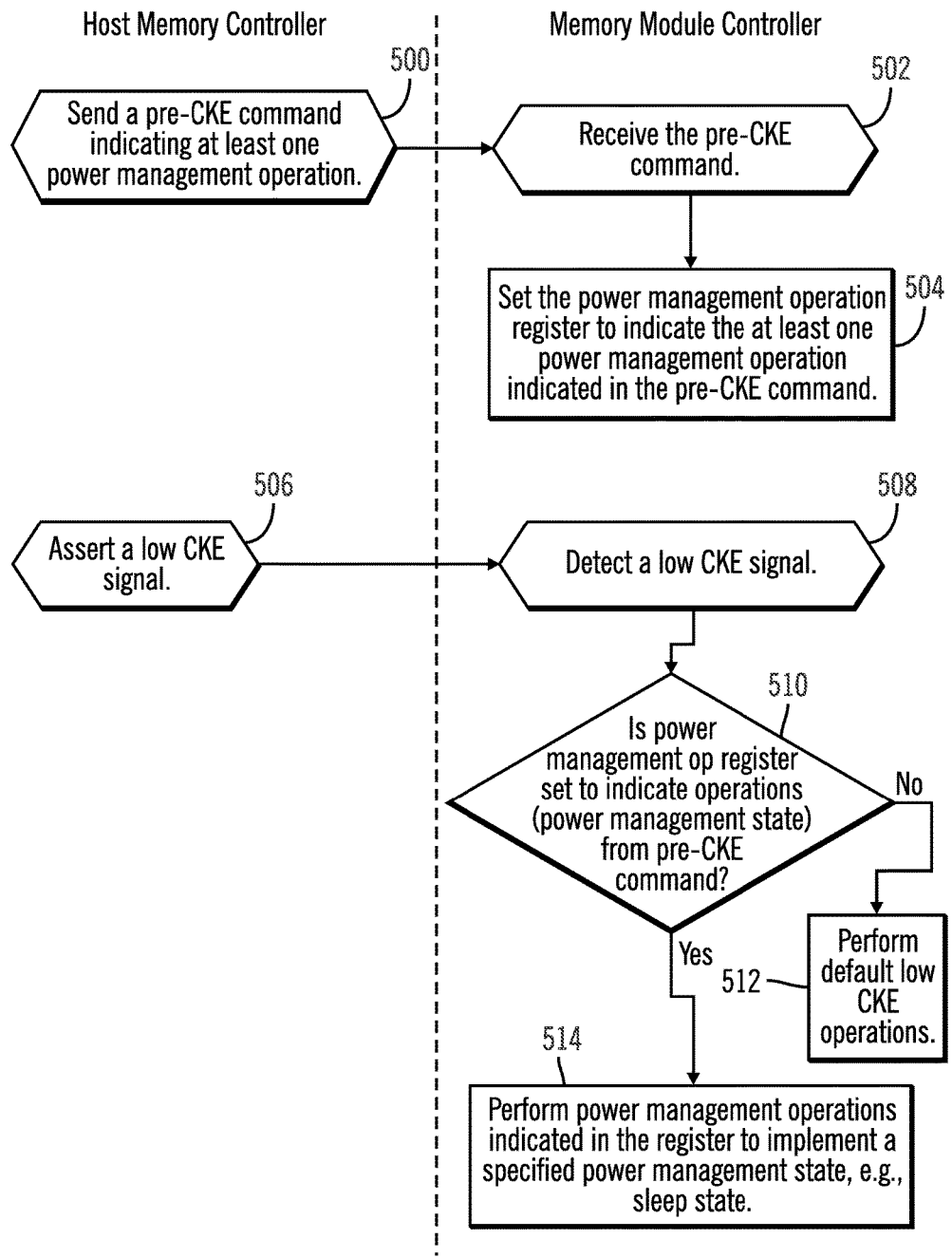
FIG. 14 illustrates an embodiment of operations to use commands to indicate power management operations.

FIG. 14 illustrates an embodiment of operations performed by the host memory controller 6 and memory module controller 20 to facilitate power management operations using the CKE low signal. To initiate operations to change the power management mode, such as change to one of various recognized sleep modes, the host memory controller 6 sends (at block 500) a pre-CKE command to the memory module controller 20 over the bus 10 indicating one or more power management operations. In one embodiment, the pre-CKE command may indicate one or more specific operations or provide a code representing a series of operations. For instance, the pre-CKE command may indicate a power management state, such as a system state or sleep mode, e.g., S 3, S 4, and S 5 of the ACPI sleep mode states, which the memory module controller 20 may interpret as the series of operations to perform to implement that state.

Upon receiving (at block 502) the pre-CKE command, the memory module controller 20 sets the power management operation register 26 to indicate the at least one power management operation indicated in the pre-CKE command. At a subsequent time when the host memory controller 6 wants the memory module 8a, 8b to implement the state change of the indicated power management operations, the host memory controller 6 asserts (at block 506) the CKE low signal 56, e.g., low on pins 64 or 66 (FIG. 2). Upon detecting (at block 508) the CKE low signal, the memory module controller 20 determines (at block 510) whether the power management operation register 56 indicates operations to perform, such as indicating a sleep mode state or specific operations. If no operations are indicated, such as a null or default value, the memory module controller 20 may perform (at block 512) a default operation for handling a CKE low signal, such as deactivating internal clock signals, a pre-charge power-down or self refresh operation. If operations or a power mode are indicated in the register 26, then the memory module controller 20 performs (at block 514) the power management operations indicated in the register 26 to implement a specified power management state, e.g., sleep state.

Described embodiments provide techniques for configuring a memory module controller to perform a series of power management operations at a subsequent time using the CKE low signal. After the pre-CKE command is sent, the host memory controller 6 will assert the CKE low signal to trigger more involved power management operations to change the power mode than would normally be triggered in response to the CKE low signal. With the described embodiments, fewer signals are needed for power management because a more involved power management operation, such as transitioning to sleep mode, may be initiated with the CKE low signal Providing a Host Memory Controller Write Credits for Write Commands Described embodiments provide techniques to supply the host memory controller 6 write credits to use for sending write commands by including the write credits in returned read data packets to reduce consuming bus bandwidth on the bus 10.

With respect to FIG. 1, the host memory controller 6 includes a write credit counter 9 and will only send write commands when the write credit counter 9 has positive credits. The write credit counter 9 is decremented when sending a write command. There may be one write credit counter 9 for each memory module 8a, 8b. The memory module 8 includes a write buffer 28 to buffer received write data that is then later destaged to storage elements in the memory chips 12, 14, 16, 18. The memory module controller 20 has a write credit counter 30 indicating accumulated write credits to return to the host memory controller 6. The write credits are used to regulate use of the write buffer 28 so the host memory controller 6 does not send write data to overflow the write buffer 28.

Figure 15:
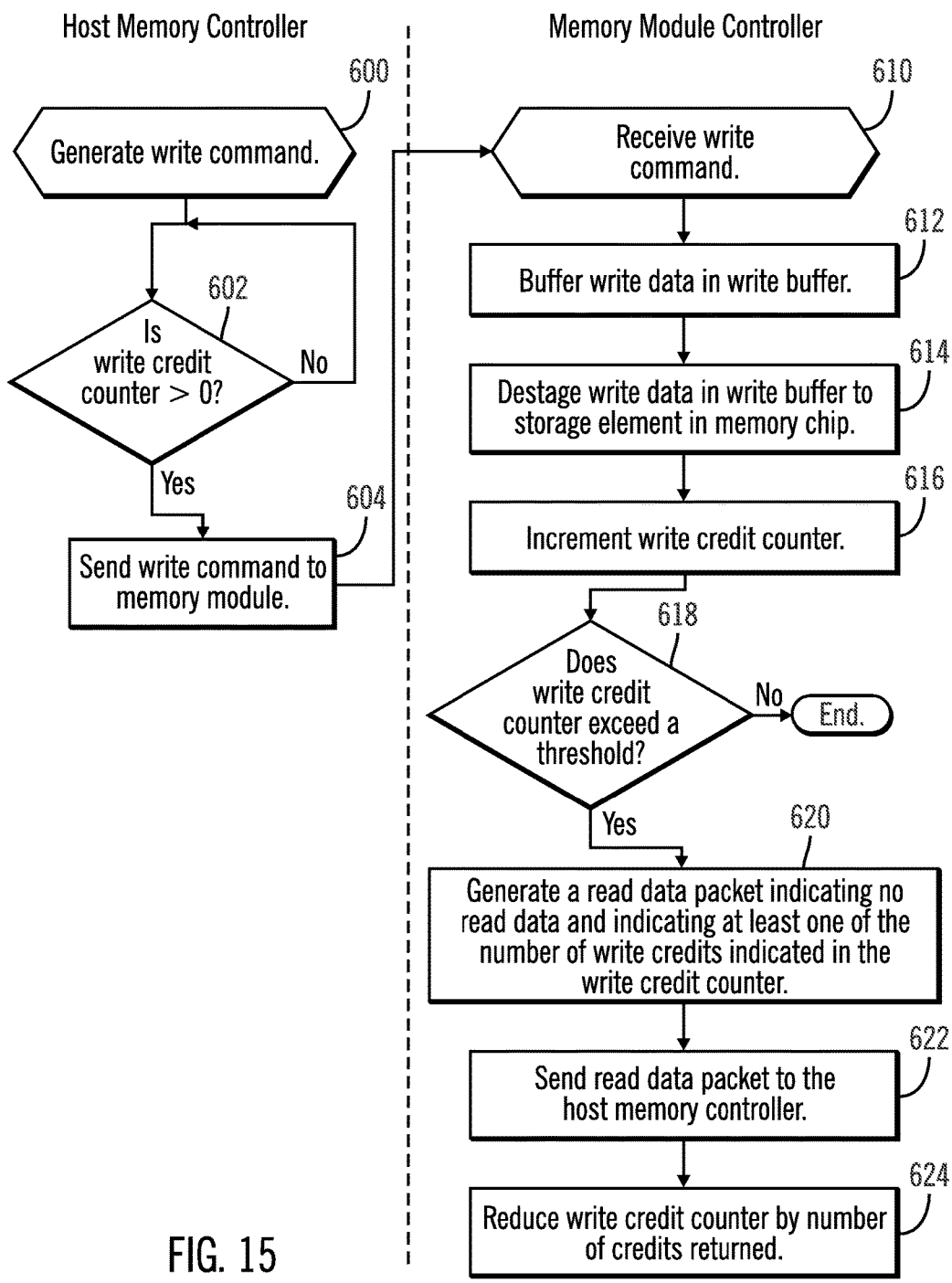
FIG. 15 illustrates an embodiment of operations to use write credits to send write commands and return write credits to the host memory controller.

FIG. 15 illustrates an embodiment of operations for the host memory controller 6 and memory module controller 20 to process a write command. Upon generating a write command, the host memory controller 6 determines (at block 602) whether the write credit counter 30 is greater than zero, non-empty. If so, the write command is sent (at block 604) to the memory module 8. If (at block 602) the host write credit counter 9 is empty, then the host memory controller 6 waits until credits are available to send the write command.

Upon receiving (at block 610) a write command, the memory module controller 20 buffers (at block 612) the write data in the write buffer 30. Upon destaging (at block 614) the write data from the write buffer 30 to the storage elements in the memory chips 12, 14, 16, 18, the memory module controller 20 increments (at block 616) the write credit counter 30 indicating a credit to return to the host memory controller 6 to allow another write command. If (at block 618) the write credit counter 30 exceeds a threshold, then the memory module controller 20 generates (at block 620) a read data packet indicating no read data and indicating at least one of the write credits indicated in the write credit counter 30. The read data packet is sent (at block 622) to the host memory controller 6 and the write credit counter 30 is reduced (at block 624) by the number of credits returned. In certain embodiments, there may be a limited number of credits returned, so the write credit counter 30 may or may not be reduced to zero. In this way, if a read packet is not sent for an extended time, the memory module controller 20 sends a read data packet without data to provide write credits so the host memory controller 8 is not starved of write credits and blocked from sending write commands. In alternative, the write credits may be returned in packets other than a read data packet.

Figure 16:
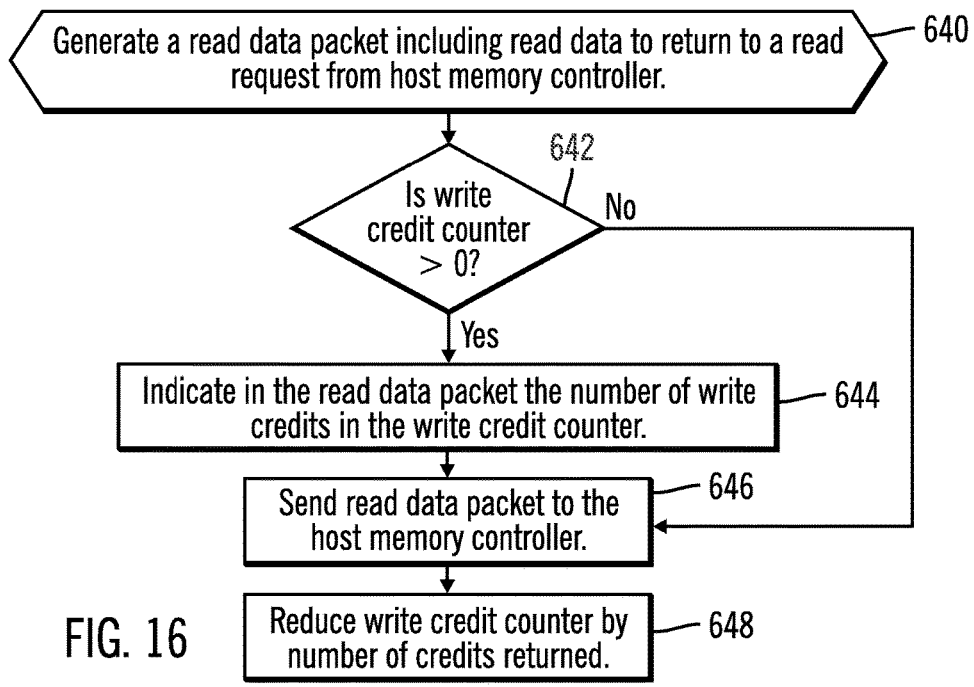
FIG. 16 illustrates an embodiment of operations to generate a read data packet with a write credit counter.

FIG. 16 illustrates an embodiment of operations performed by the memory module controller 20 to generate a read data packet to return to the host memory controller 4. Upon generating (at block 640) a read data packet including read data to return to a read request from host memory controller 6, if (at block 642) the write credit counter 30 is greater than zero, then the memory module controller 20 indicates (at block 644) in the read data packet some or all of write credits in the counter 30 and sends (at block 646) the read data packet to the host memory controller 6. The write credit counter 30 is reduced (at block 648) by the number of write credits returned, which may or may not be all the credits in the counter 30. In this way, write credits are batched in the read data packet to return to the host memory controller 6, thus optimizing message usage to communicate information. The memory module controller 20 may not indicate all of the credits in one packet, as there are a fixed set of responses. For instance, the memory module controller 20 may be able to indicate 0, 1, or 4 in the read packet for the number of write credits to return or 0, 1, 4, or 8 for the non-data packet if write credits are being returned (at block 620 in FIG. 15) without read data.

Figure 17:
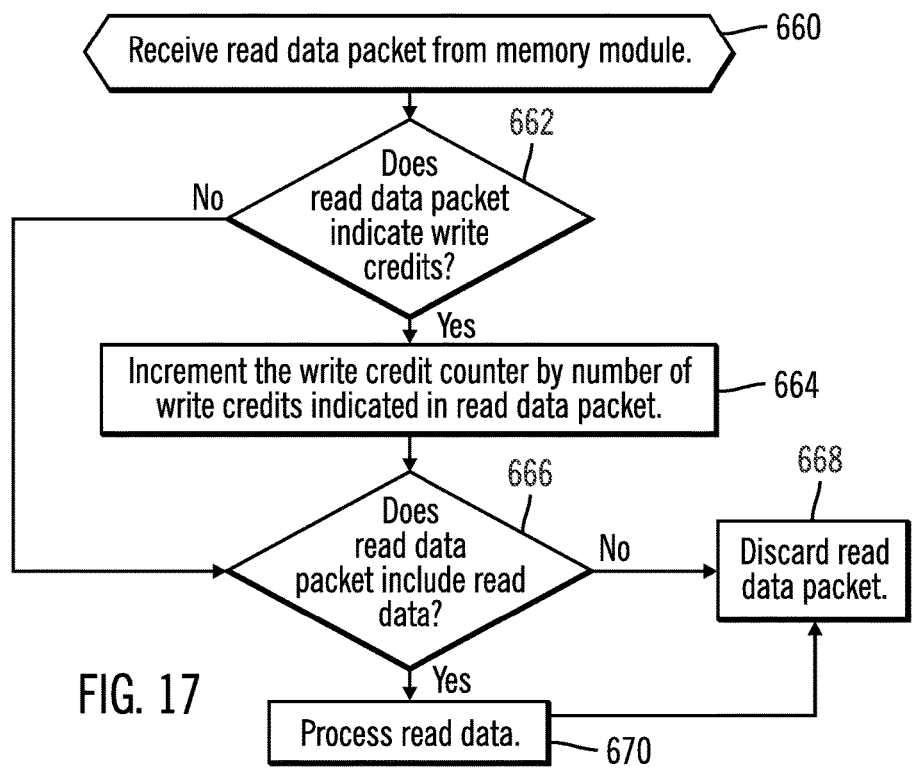
FIG. 17 illustrates an embodiment of operations to process a read data packet.

FIG. 17 illustrates an embodiment of operations performed by the host memory controller 6 to process a read data packet from the memory module 8. Upon receiving (at block 660) the read data packet, if (at block 662) the read data packet indicates write credits, then the host memory controller 6 increments (at block 664) the write credit counter 9 by the number of write credits indicated in read data packet. After incrementing the write credit counter 9 (from block 664) or if there are no provided write credits (from the no branch of block 662), if (at block 666) the read data packet includes read data, the read data is processed (at block 670). The read data packet is discarded (at block 668) after reading the data or if the packet does not include data (from the no branch of block 666)

Described embodiments provide techniques for the memory module 8 to communicate write credits to the host memory controller 6 in a manner that reduces bus 10 bandwidth by batching write credits in read packets or other messages already being used.

Performing Error Handling Operations Using Error Signals

Described embodiments provide techniques for a simplified error flow at the memory module 8 to coordinate error handling with the host memory controller 6. In described embodiments, the memory module controller 20 may signal an error on the error pin 68 ERR0# shown in the pin-out design of FIG. 2. The memory module controller 20 may assert an error (ERR) low signal on the error pin 68 to signal commencement of error handling operations and assert an error (ERR) high signal on the error pin 68 to signal that the error mode has ended and the bus 10 is returned to an initial state ready for operation. In this way communication to coordinate error handling between the memory module controller 20 and the host memory controller 6 on the bus 10 comprises a limited number of signals to avoid consuming bandwidth with more extensive error handling coordination.

Figure 18:
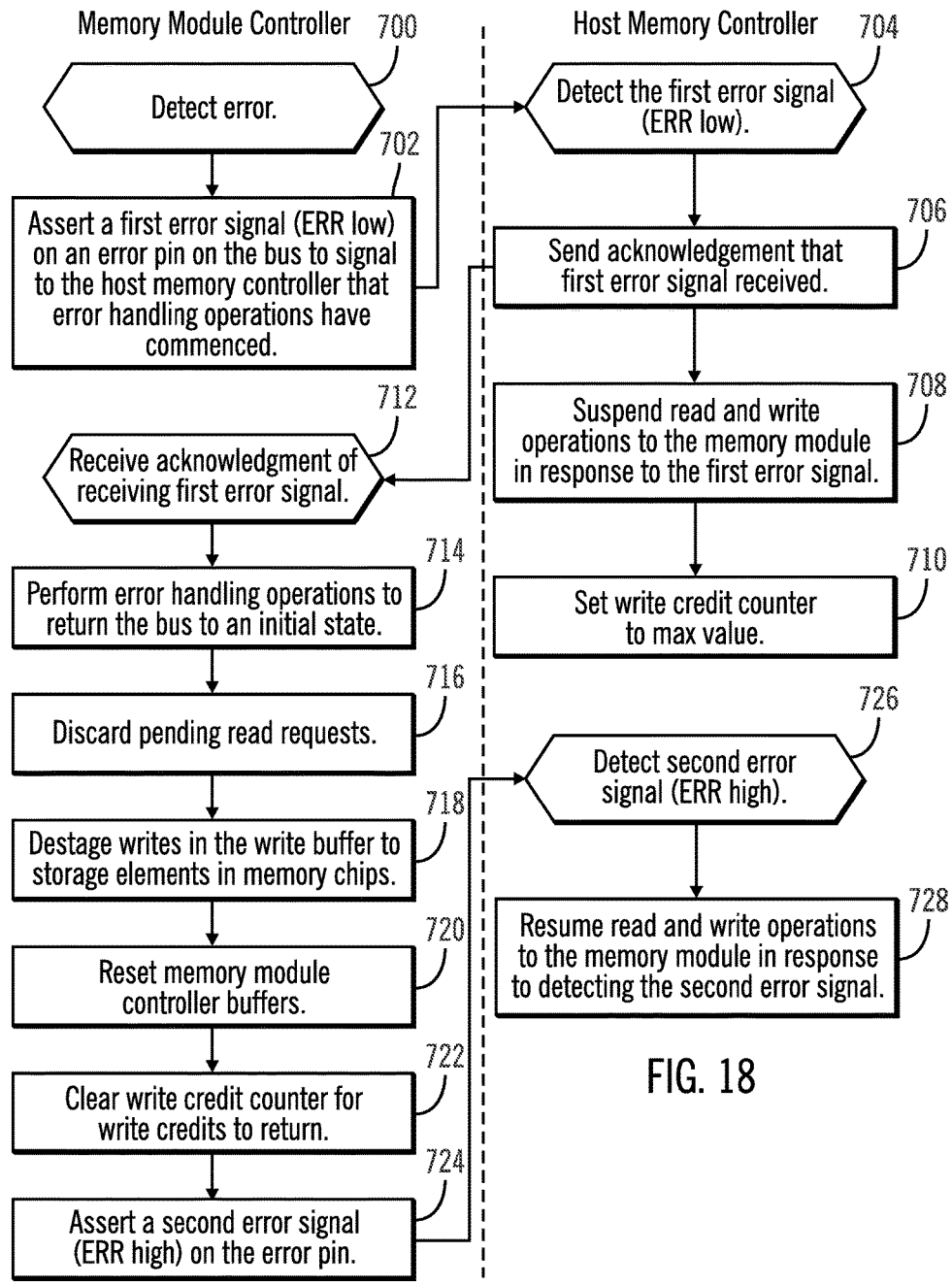
FIG. 18 illustrates an embodiment of operations to process a flow of error operations using an error signal.

FIG. 18 illustrates an embodiment of operations between the memory module controller 20 and the host memory controller 6 to manager error handling operations upon an error being detected in the memory module 8. Upon detecting (at block 700) an error, the memory module controller 20 asserts (at block 702) a first error signal, e.g., an ERR low signal on pin 68 (FIG. 2), on the bus 10 to signal to the host memory controller 6 that error handling operations have commenced. Upon detecting (at block 704) the first error signal, e.g., an ERR low signal on pin 68, the host memory controller 6 sends (at block 706) an acknowledgment that the first error signal was received and then continues to suspend (at block 708) read and write operations to the memory module 8 having the error in response to the first error signal. The host memory controller 6 may perform further error handling operations, such as set (at block 710) the write credit counter 9 to a maximum value. In this way, the host memory controller 6 assumes that as part of error handling all writes will be flushed from the write buffer 28 to storage elements in the memory chips 12, 14, 16, 18.

Upon receiving (at block 712) the acknowledgment from the host memory controller 6 of receiving the first error signal, the memory module controller 20 performs error handling operations to return the bus 10 to an initial state. Such operations may include discarding (at block 716) all pending read requests, destaging (at block 718) writes in the write buffer 28 to storage elements in the memory chips 12, 14, 16, 18, and clearing (at block 722) the write credit counter 30 of write credits to return. After completing error handling operations, the memory module controller 20 asserts (at block 724) a second error signal, such as ERR high on error pin 68, to signal that error handling has completed. Upon detecting (at block 726) this second error signal, the host memory controller 6 resumes (at block 728) read and write operations to the memory module in response to detecting the second error signal.

With described embodiments, the memory module 8 and the host memory controller 6 coordinate with a limited number of signals and perform full error handling operations without exchanging numerous communications on the errors and transactions performed over the bus. Each component 8 and 20 assumes the other performs a full re-initialization of the bus 10 in response to the error at the memory module 8.

Using an Error Signal to Indicate a Write Request Error and Write Request Acceptance Described embodiments provide techniques for the memory module controller 20 to indicate to the host memory controller 6 that a write request completed successfully by not asserting an error signal, such as an error signal low, within a predetermined time of the write request being sent and indicating a write request failed by asserting an error signal. Upon detecting the error signal, the host memory controller 6 resends the write request if the error signal is received within a predetermined time of sending the write request. In this way, bus 10 bandwidth is conserved by not sending write complete acknowledgements to the host memory controller 6 after completing every write request.

Figure 19:
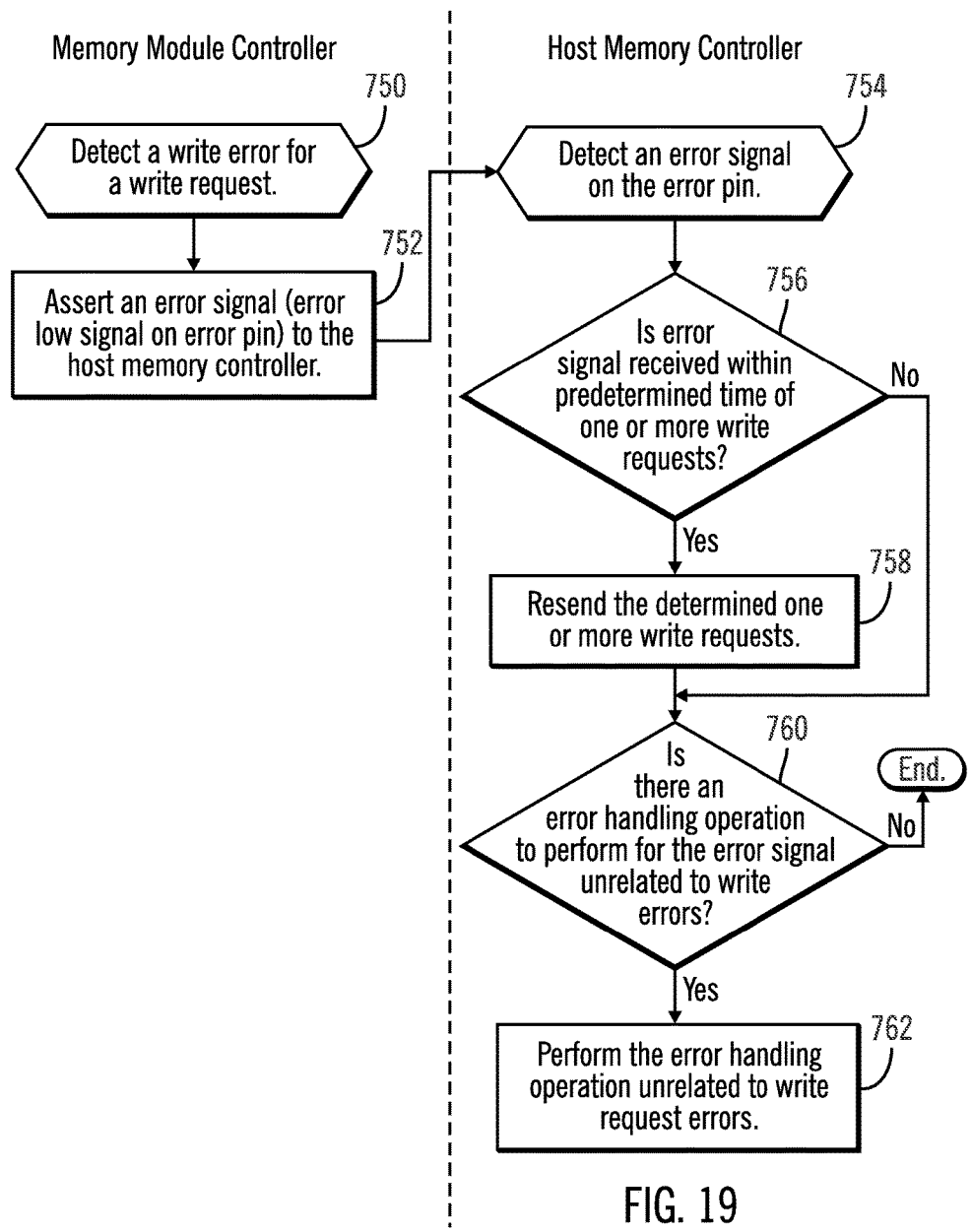
FIG. 19 illustrates an embodiment of operations to process a write error.

FIG. 19 illustrates an embodiment of operations performed by the memory module controller 20 and a host memory controller 6 to indicate acceptance of a write request and errors in a write request. Upon the memory module controller 20 detecting (at block 750) a write error with one of the write requests being processed, the memory module controller 20 asserts an error signal, such as an error low signal ERR0# on pin 68 (FIG. 3). The memory module controller 20 keeps the error high signal active to indicate no error has occurred. The memory module controller 20 may additionally use the ERR0# signal on pin 68 to indicate errors unrelated to write request errors. Further, the memory module controller 20 impliedly indicates successful completion of a write request by not sending the error low signal within a predetermined time of the write request, such as when the write request was sent or received.

Upon the host memory controller 6 detecting (at block 754) the error low signal, if (at block 756) the error low signal is received within a predetermined time of one or more write requests, then the host memory controller 20 resends (at block 758) the determined one or more requests sent within the predetermined time of receiving the error low signal. In certain embodiments, the host memory controller 20 resends the write requests even if the error signal is unrelated to write errors. In this way, the host memory controller 20 processes write requests as having completed successfully if the error signal low is not received within the predetermined time and processes the write request as having failed if the error signal low is received within the predetermined time even if the error signal low was signaling an error unrelated to write request errors.

After resending the write requests (at block 758) or if there are write requests sent within the predetermined time (from the no branch of block 756), the host memory controller 6 determines (at block 760) whether there is an error handling operation related to the error low signal to perform unrelated to write errors. If so, then the host memory controller 6 performs (at block 762) the error handling operation unrelated to write errors.

With the described embodiments, the memory module 8 does not send write complete acknowledgments after completing every write. Instead, the host memory controller 6 assumes the write completed if an error signal is not received within a predetermined time following the write request. Further, the host memory controller 6 resends the write request if the error signal is received within the predetermined time of sending the write request even if the memory module controller 20 was signaling an error unrelated to a write error.

Scrambling Read Data in a Memory Module

Described embodiments provide techniques for the memory module controller 20 to descramble write data and store the write data unscrambled and then scramble the stored data to return to a read request, including the scrambling of the read address. Scrambling the data being transmitted on the bus 10 for both read and writes is performed to avoid the probability of a vexatious sequence occurring in the transmission that would cause errors on the bus 10.

To allow for the scrambling of the read data, the host memory controller 6 and the memory module controller 20 maintain scramble seed values 11 and 32 (shown in FIGS. 1 and 2), respectively. Both seed values are initialized to a common value, and then incremented after processing a read data packet so that the incremented seed values 32 and 11 are independently set to the same value for the same read data packet and are used to scramble and descramble read requested data in a read data packet returned to the host memory controller 6 in response to a read request. Further, the memory module controller 20 and the host memory controller 6 implement circuit logic for the same data scrambling algorithm using the seed values 11, 32 to scramble and descramble data to remove the likelihood of a vexatious sequence occurring on the bus 10. In alternative embodiments, the host memory controller 6 and the memory module controller 20 may update the seed values 11 and 32 by additional operations known in the art.

Figure 20:
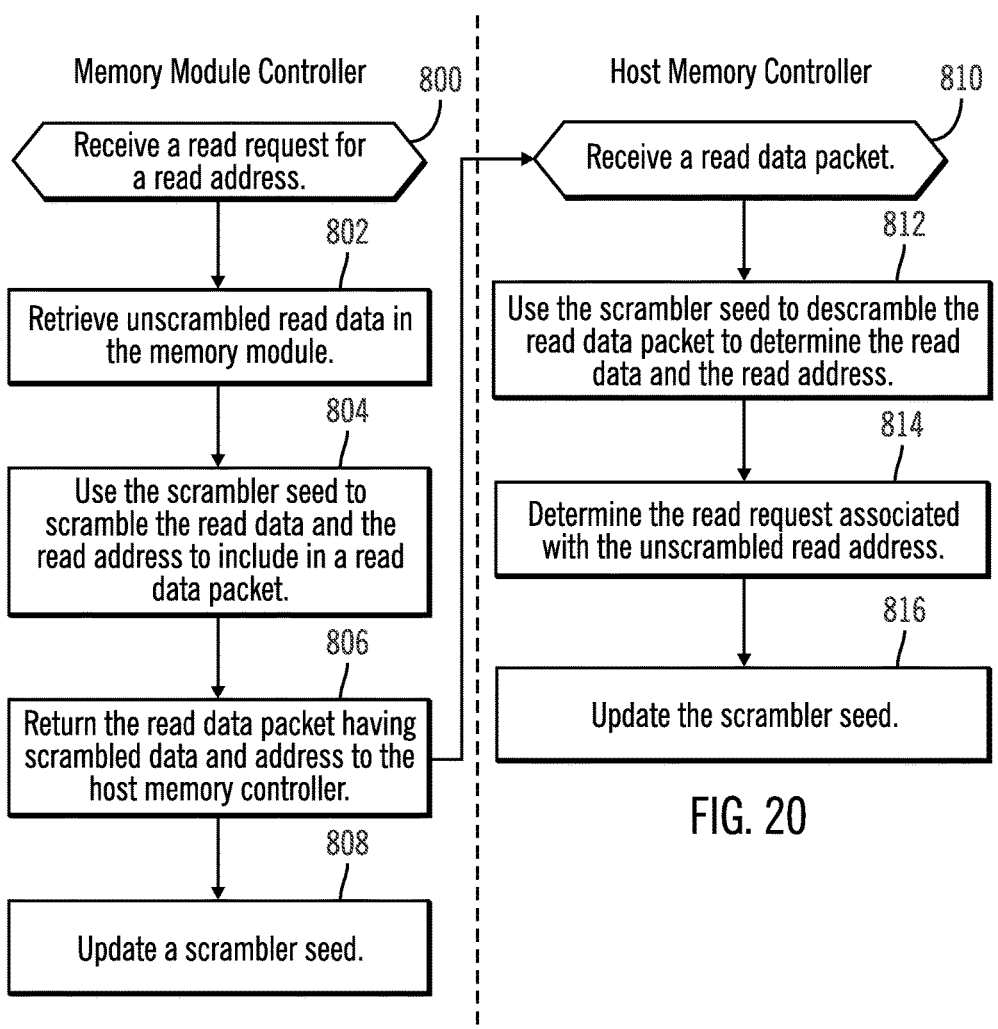
FIG. 20 illustrates an embodiment of operations to scramble and descramble data transmitted over the bus.

FIG. 20 illustrates an embodiment of operations performed by the memory module controller 20 and a host memory controller 6 to scramble read data transmitted across the bus 10. Upon receiving (at block 800) a read request for a read address from the host memory controller 6, the memory module controller 20 retrieves (at block 802) the unscrambled read data from a storage element, e.g., DRAM chip 12, 14, 16, 18, in the memory module 8. The memory module controller 20 uses (at block 804) the scramble seed 32 to scramble the requested read data and the read address to include in a read data packet to return (at block 806) to the read request from the host memory controller 6.

The scrambler seed 32 is then updated (at block 808). In one embodiment, then scrambler seed 11, 32 is updated in a pseudo-random fashion using a linear feedback shift register (LFSR) circuit.

Upon receiving a read packet, the host memory controller 6 uses (at block 812) the scrambler seed 11 to descramble the read data packet to determine the read data and read address. The read request associated with the unscrambled address is then determined (at block 814) so that the read data may be returned to that read request. The scrambler seed 11 is updated (at block 816). In an alternative embodiment, the scrambler seeds 11 and 32 may be updated before being used to scramble and descramble.

Figure 21:
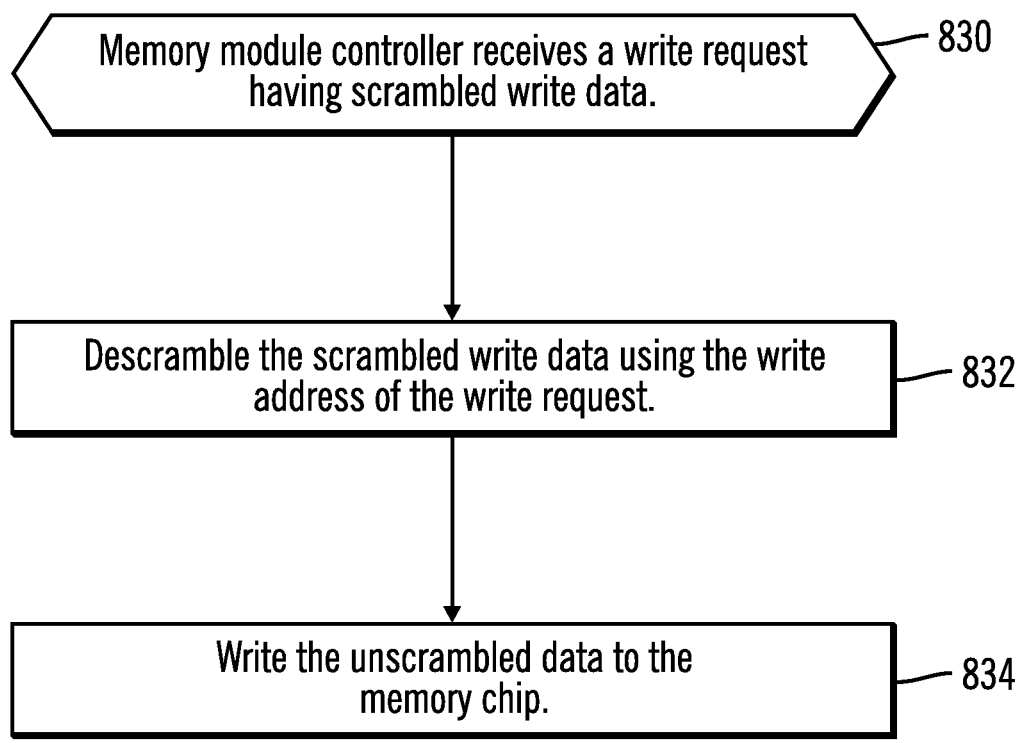
FIG. 21 illustrates an embodiment of operations to descramble write data in the memory module.

FIG. 21 illustrates an embodiment of operations performed by the memory module controller 20 to manage scrambled write data. Upon receiving (at block 830) a write request having scrambled write data from the host memory controller 6, the memory module controller 20 descrambles (at block 832) the scrambled write data using the write address of the write request and then writes (at block 834) the unscrambled data to the memory chip 12, 14, 16, 18 in the memory module 8.

Described embodiments allow the memory module controller 20 to store the read data unscrambled and then scramble both the read data and address to return on the bus 10 by using seed values 11 and 32 that each component 8 and 20 updates for scrambling and descrambling operations.

Selecting One of a Plurality of Bus Interface Configurations to Use

Described embodiments provide an interface parameter 34 to configure in the memory module 8 that is used by the memory controller 20 to determine the bus interface configuration used by the memory module 8. In this way, the memory module controller 20 may operate with different bus interfaces 10, such as bus interfaces having different bus widths, i.e., bus data widths, such as 9 bit interface, 18 bit interface, 72 bit interface, etc. For instance, different types of DIMMs in which the memory module controller 20 may be implemented may have different bus width configurations, such as different numbers of pins, e.g., 72, 168, 184, 240, etc., to implement the different bus widths.

Figure 22:
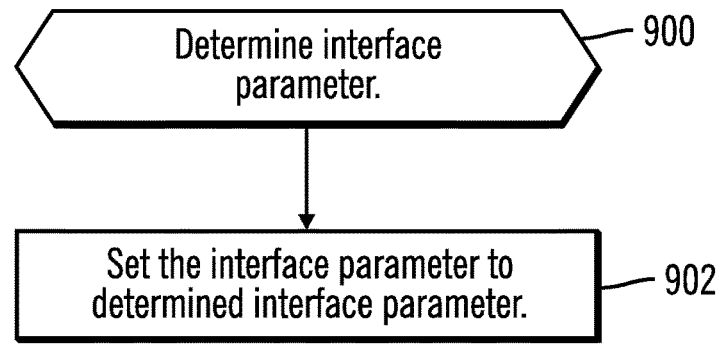
FIG. 22 illustrates an embodiment of operations to set a parameter indicting a bus interface configuration.

FIG. 22 illustrates an embodiment of operations performed by the memory module controller 20 to determine (at block 900) the interface parameter 34. The memory module controller 20 may determine the bus 10 interface configuration during initialization by scanning the bus 10 or by querying the host memory controller 6. Alternatively, the host memory controller 6 or other component may communicate information on the bus 10 interface configuration, such as the bus width, pin configuration, etc., over the bus 10 during initialization. In a yet further embodiment, the memory module 8 may have one or more strapping pins external to the bus 10 that are coupled to the memory module 8 that communicate the bus 10 interface configuration. The host memory controller 6 or other component may assert the bus interface configuration on the at least one strapping pin. One strapping pin may be used if there are only two supported bus interface configurations to communicate. If there are more than two supported bus interface configurations that the memory module controller 20 supports, then there may be additional pins to indicate more than two bus interface configurations. Upon determining (at block 900) the bus interface configuration, the interface parameter 32 is set to indicate the determined interface parameter.

Figure 23:
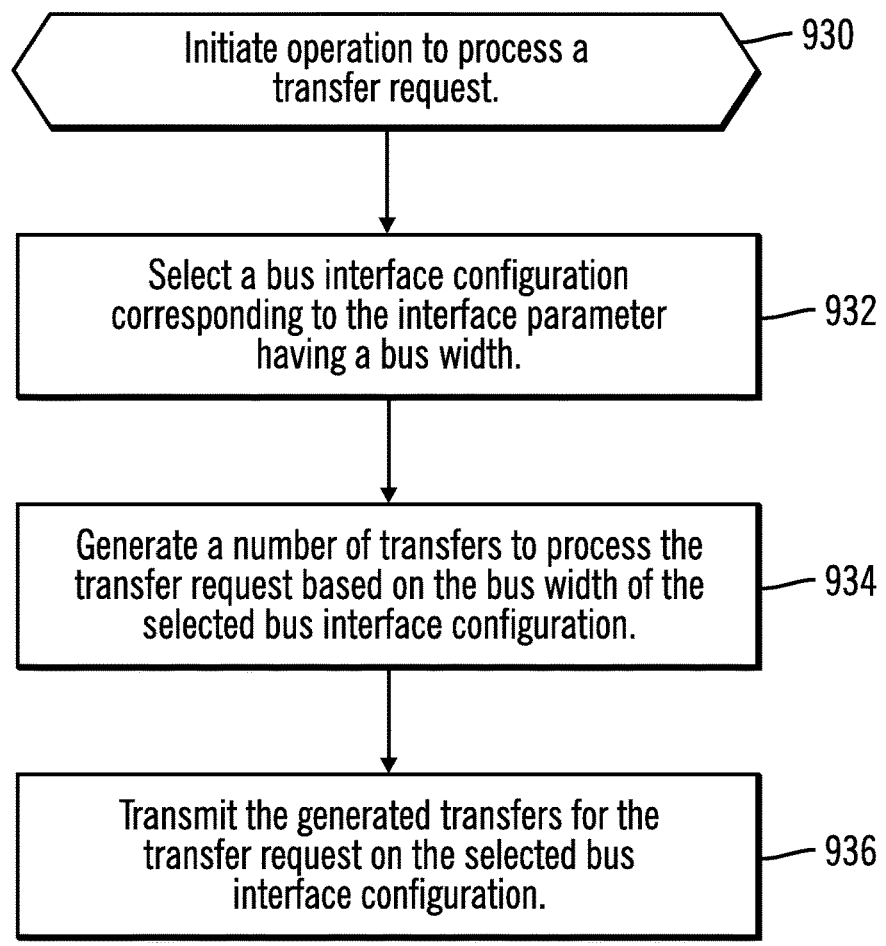
FIG. 23 illustrates an embodiment of operation to select a bus interface configuration to process a transfer request.

FIG. 23 illustrates an embodiment of operations performed by the memory module controller 20 to process a transfer request based on the bus interface configuration. Upon initiating an operation to process a transfer request (at block 930), the memory module controller 20 selects (at block 932) a bus interface configuration corresponding to the interface parameter 32, where the selected bus configuration may comprise one of a first, second, third, or further bus configurations, each having a different bus width and pin configuration. For instance, the bus configurations may comprise a 9 bit, 18 bit, and 72 bit data bus, where each of these bus configurations may have a different number pins. This selected bus configuration is used when processing transfer requests and other operations.

The memory module controller 20 generates (at block 934) a number of transfers to process the transfer request based on the bus width of the selected bus interface configuration. For instance, if the selected bus configuration has a smaller bus width than other possible configurations supported by the memory module controller 20, then that bus configuration will require more transfers to accommodate its smaller bus width than required for a supported bus interface configuration having a larger bus width and more pins. In this way, the memory module controller 20 may divide a transfer request into different number of bus transactions based on the bus width of the selected bus interface configuration. The generated transfers are transmitted (at block 936) on the selected bus interface configuration.

Described embodiments provide a memory module controller 20 that is operable in memory modules 8 having different bus interface configurations to allow the memory module controller 20 to support the bus configuration of the memory module 8 in which it is implemented.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The invention claimed is:

1. A device implemented in a first memory module coupled to a bus connected to a host memory controller and a second memory module, wherein the second memory module includes memory chips, the first memory module comprising:

memory chips to store data, wherein the first and second memory modules are separately and independently connected to the bus; and a first memory module controller to:

determine a difference of at least one hardware component between the first memory module and the second memory module that results in a timing difference of output of data between the first memory module and the second memory module;

determine a timing adjustment based on the timing difference of the at least one hardware component to cause output from the first memory module to the host memory controller to match a timing of output of data at the second memory module to the host memory controller to account for the timing difference between the first memory module and the second memory module, wherein the timing adjustment is to:
  accelerate the timing in response to the first memory module having at least one hardware component effecting timing of the output of data that is not included in the second memory module; and
  add a delay to the timing in response to the second memory module having at least one hardware component effecting the timing of the output of data at the second memory module that is not included in the first memory module; and
adjust a timing of an output of data to the host memory controller based on the timing adjustment to match a timing of output of data at the second memory module, wherein the timing of the output of data to the host memory controller on the bus from both the first and the second memory modules matches before reaching the host memory controller.

2. The device of claim 1, wherein the timing adjustment comprises both accelerate the timing and add the delay, wherein the timing adjustment comprises a net of the accelerate and the add the delay.

3. The device of claim 1, wherein the at least one hardware component comprises a data buffer in the first memory module, wherein the timing adjustment comprises delaying the timing of the output of data when the second memory module does not include a data buffer such as included in the first memory module.

4. The device of claim 1, wherein the at least one hardware component comprises a register in the second memory module, wherein the timing adjustment comprises delaying the timing of the output of data when the second memory module includes the register that is not included in the first memory module.

5. The device of claim 4, wherein the register in the second memory module is on a command, address and control busses.

6. The device of claim 1, wherein the output of data having the timing adjusted comprises output from a data buffer of the first memory module.

7. The device of claim 1, wherein the first and second memory modules comprise different types of dual in-line memory modules (DIMMs).

8. The device of claim 7, wherein the second memory module comprises one of an unbufferred DIMM (UDIMM), registered DIMM (RDIMM), and a load reduced DIMM (LRDIMM).

9. The device of claim 8, wherein the timing adjustment comprises accelerating the timing of the output of data when the first memory module includes a data buffer and the second memory module comprises a UDIMM.

10. The device of claim 8, wherein the timing adjustment comprises delaying the timing of the output of data when the second memory module comprises the RDIMM and the first memory module does not include a register and accelerating the timing of the output of data when the first memory module includes a data buffer on the output of data.

11. The device of claim 8, wherein the timing adjustment comprises delaying the timing of the output of data when the second memory module comprises the LRDIMM and the first memory module does not include a data buffer.

12. An apparatus comprising:
a host memory controller;
a bus;
a first memory module and a second memory module coupled to the host memory controller over the bus, wherein the first and the second memory modules each include memory chips to store data, wherein the second memory module includes a second memory module controller, and wherein the first and second memory modules are separately and independently connected to the bus;
a first memory module controller implemented in the first memory module to:
  determine a difference of at least one hardware component between the first memory module and the second memory module that results in a timing difference of output of data between the first memory module and the second memory module;
  determine a timing adjustment based on the timing difference of the at least one hardware component to cause output from the first memory module to the host memory controller to match a timing of output of data at the second memory module to the host memory controller to account for the timing difference between the first memory module and the second memory module, wherein the determined timing adjustment is to:
    accelerate the timing in response to the first memory module having at least one hardware component effecting timing of the output of data that is not included in the second memory module; and
    add a delay to the timing in response to the second memory module having at least one hardware component effecting the timing of the output of data at the second memory module that is not included in the first memory module; and
  adjust a timing of an output of data to the host memory controller based on the timing adjustment to match a timing of output of data at the second memory module, wherein the timing of the output of data to the host memory controller on the bus from both the first and the second memory modules matches before reaching the host memory controller.

13. The apparatus of claim 12, wherein the timing adjustment comprises both accelerate the timing and add the delay, wherein the determined timing adjustment comprises a net of the accelerate and the add the delay.

14. The apparatus of claim 12, wherein the at least one hardware component comprises a data buffer in the first memory module, wherein the timing adjustment comprises delaying the timing of the output of data when the second memory module does not include a data buffer such as included in the first memory module.

15. The apparatus of claim 12, wherein the at least one hardware component comprises a register in the second memory module, wherein the timing adjustment comprises delaying the timing of the output of data when the second memory module includes the register that is not included in the first memory module.

16. The apparatus of claim 12, wherein the first and second memory modules comprise different types of dual in-line memory modules (DIMMs).

17. A method for determining a timing adjustment for a first memory module coupled to a bus connected to a host memory controller and a second memory module, wherein the first and second memory module each include memory chips and controllers, comprising:
determining a difference of at least one hardware component between the first memory module and the second memory module that results in a timing difference of output of data between the first memory module and the second memory module, and wherein the first and second memory modules are separately and independently connected to the bus;

determining a timing adjustment based on the timing difference of the at least one hardware component to cause output from the first memory module to the host memory controller to match a timing of output of data at the second memory module to the host memory controller to account for the timing difference between the first memory module and the second memory module, wherein the determined timing adjustment is to:

accelerate the timing in response to the first memory module having at least one hardware component effecting timing of the output of data that is not included in the second memory module; and add a delay to the timing in response to the second memory module having at least one hardware component effecting the timing of the output of data at the second memory module that is not included in the first memory module; and adjusting a timing of an output of data to the host memory controller based on the timing adjustment to match a timing of output of data at the second memory module, wherein the timing of the output of data to the host memory controller on the bus from both the first and the second memory modules matches before reaching the host memory controller.

18. The method of claim 17, wherein the timing adjustment comprises both accelerating the timing and adding the delay, wherein the timing adjustment comprises a net of the accelerating and the adding the delay.

19. The method of claim 17, wherein the at least one hardware component comprises a data buffer in the first memory module, wherein the timing adjustment comprises delaying the timing of the output of data when the second memory module does not include a data buffer such as included in the first memory module.

20. The method of claim 17, wherein the at least one hardware component comprises a register in the second memory module, wherein the timing adjustment comprises delaying the timing of the output of data when the second memory module includes the register that is not included in the first memory module.

21. The method of claim 17, wherein the output of data having the timing adjusted comprises output of data from a data buffer of the first memory module.

22. The method of claim 17, wherein the first and second memory modules comprise different types of dual in-line memory modules (DIMMs).

\* \* \* \* \*